United States Patent [19]
Yano et al.

[11] Patent Number: 5,850,815
[45] Date of Patent: Dec. 22, 1998

[54] CONTROL SYSTEM AND CONTROL PROCESS IN INTERNAL COMBUSTION ENGINE

[75] Inventors: Toru Yano; Isao Komoriya; Yuji Yasui; Takahiro Yonekura; Yutaka Asano; Yusuke Tatara; Eisuke Kimura; Kohei Hanada, all of Saitama, Japan

[73] Assignee: Honda Giken Kogyo Kabushiki Kaisha, Tokyo, Japan

[21] Appl. No.: 834,195

[22] Filed: Apr. 15, 1997

[30] Foreign Application Priority Data

Apr. 17, 1996 [JP] Japan .................................... 8-095710
Apr. 22, 1996 [JP] Japan .................................... 8-122803

[51] Int. Cl.$^6$ ........................................................ F02P 5/00
[52] U.S. Cl. .................................................... 123/417
[58] Field of Search .................................. 123/417, 414, 123/90.15, 90.16, 90.17, 321, 322, 348, 345, 347

[56] References Cited

U.S. PATENT DOCUMENTS 5,577,475  11/1996  De Backer et al. .................... 123/417
5,584,274  12/1996  Fukui et al. ............................ 123/414
5,640,939  6/1997   Shimada et al. ....................... 123/417

Primary Examiner—Raymond A. Nelli
Attorney, Agent, or Firm—Lyon & Lyon LLP

[57] ABSTRACT

A control system is provided in an internal combustion engine in which a valve timing such as an opening time point and lift amount of an intake valve can be switched to a low-speed or high-speed valve timing within a lean-burn control range established in accordance with the operational state, such as an intake pipe internal absolute pressure and an engine revolution number of the engine, wherein an air-fuel ratio of an air-fuel mixture supplied to the internal combustion engine is enriched for a predetermined time when the valve timing is switched from the low-speed valve timing to the high-speed valve timing while carrying out a lean-burn control. Thus, even when the valve timing is switched over to the high-speed valve timing, the lean-burn control is carried out to prevent a misfiring or an unstable combustion state caused when the valve timing is switched during the lean-burn control, thereby providing a reduction in emission and an enhancement in drivability, while enhancing the specific fuel consumption.

9 Claims, 19 Drawing Sheets

CONTROL SYSTEM AND CONTROL PROCESS IN INTERNAL COMBUSTION ENGINE

BACKGROUND OF THE INVENTION

1. Field of the Invention

The present invention relates to a control system and a control process in an internal combustion engine, and particularly to, a control system and a control process in an internal combustion engine for controlling the switching of an air-fuel ratio of an air-fuel mixture supplied to the internal combustion engine to a lean level or a rich level.

2. Description of the Related Art

Conventionally, a control system in an internal combustion engine is known, in which the valve timing such as the valve opening time point and the valve lift amount of an intake valve and/or an exhaust valve can be switched, for example, between two stages of a low-speed valve timing and a high-speed valve timing.

In such a known control system in the internal combustion engine, when the valve timing is being switched to the low-speed valve timing, a so-called lean-burn control is carried out for controlling the air-fuel ratio of an air-fuel mixture supplied to the internal combustion engine to be at a lean level when the engine is in an environment where an intense swirl or turbulent flow can be produced within a combustion chamber to enhance the combustion speed. On the other hand, when the valve timing is being switched to the high-speed valve timing, the suction efficiency is increased to control the air-fuel ratio to be a theoretic air-fuel ratio or at a rich level in order to enhance the output power from the engine.

In the above known control system in the internal combustion engine, however, the lean-burn control is carried out only when the low-speed valve timing is selected and for this reason, an enhancement in specific fuel consumption can be achieved only in a low-speed valve timing operational range. However, if a surplus driving force of a vehicle is taken into consideration, even when the high-speed valve timing is selected, there is still a surplus driving force while the lean limit air-fuel ratio is lowered. Therefore, the vehicle when the high-speed valve timing is selected can fully afford the lean-burn control. Therefore, if the lean-burn control is carried out within a high-speed valve timing operational range, the specific fuel consumption can be further enhanced.

However, when the lean-burn control is carried out within a high-speed valve timing operational range, the following problem is encountered.

In fact, the switching of the valve timing is controlled by a hydraulic pressure. For this reason, a long time corresponding to one cycle of the engine is required until the valve timings for all cylinders are actually switched over from the outputting of a switching command for switching the valve timing. When the high-speed valve timing is selected, the lean limit air-fuel ratio is lower, and the demanded ignition time point is also more advanced than those when the low-speed valve timing is selected. For this reason, when the valve timing is switched, it is impossible to determine which ignition timing is to be used, data for the low-speed valve ignition timing, or data for the high-speed valve ignition timing, and this may cause a misfiring.

Depending upon the operational condition, a control command for switching of the air-fuel ratio and the valve timing simultaneously may be outputted in some cases. This causes the generation of a torque shock, as well as the above-described problem.

The ternary catalyst commonly used as an exhaust emission control catalyst for an internal combustion engine has a problem that it cannot sufficiently exhibit an $NO_x$ converting effect in a condition of a lean air-fuel ratio. In order to overcome this problem, in a conventional art, the lean operational range is reduced at the sacrifice of a fuel consumption decreasing effect. In addition, the amount of $NO_x$ discharged from the internal combustion engine assumes a maximum level at an intermediate air-fuel ratio (A/F=15 to 17) between a stoichiometric level and a lean level, and therefore, it is a conventional practice to switch the air-fuel ratio stepwise between the stoichiometric level and the lean level so as to skip over this intermediate air-fuel ratio.

In recent years, an $NO_x$ occluding-type exhaust emission control catalyst is available. However, such exhaust emission control catalyst has a limit in amount of $NO_x$ occluded therein. When it is presumed that the amount of $NO_x$ occluded reaches the limit in a lean operation, the level of the air-fuel ratio is temporarily changed to a level further richer than the stoichiometric level, and meanwhile, the occluded $NO_x$ is discharged.

The conventional $NO_x$ occluding-type exhaust emission control catalyst has a problem that it is necessary to frequently control the discharge of $NO_x$ occluded in the catalyst during the lean operation because of the limitation of the amount of $NO_x$ occluded in the catalyst, resulting in a degraded drivability, a complicated control and the like. Moreover, the $NO_x$ occluding-type exhaust emission control catalyst is still not satisfactory in a heat-deterioration resistance and an oxidation poisoning resistance and as a result, the use thereof is largely limited.

On the other hand, there is another problem that when the air-fuel ratio is switched stepwise from the lean level to the stoichiometric level in an internal combustion engine equipped with a ternary catalyst, a lean atmosphere is left for a while within the ternary catalyst, so that an excessive amount of $O_2$ is stored. For this reason, even after the interior of the ternary catalyst turns into a rich atmosphere, an exhaust emission control function is not exhibited for a while, and meanwhile, $NO_x$ is discharged to the air. Such a problem arises not only when the air-fuel ratio is restored from the lean level to the stoichiometric level by a control of amount of fuel injected, but also when the air-fuel ratio is restored from the lean level to the stoichiometric level by a fuel cut control.

SUMMARY OF THE INVENTION

Accordingly, it is a first object of the present invention to enhance the specific fuel consumption by carrying out the lean-burn control even when the valve timing is being switched to the high-speed valve timing, and to prevent a misfiring or an unstable combustion state generated when the valve timing is switched during the lean-burn control, thereby providing a reduction in emission and an enhancement in drivability.

It is a second object of the present invention to prevent the amount of $NO_x$ discharged from increasing when the target air-fuel ratio in an internal combustion engine provided with the ternary catalyst is changed from the lean level to the stoichiometric level.

To achieve the above first object, according to a first aspect and feature of the present invention, there is provided a control system in an internal combustion engine, comprising a valve timing changing means for changing the valve timing of at least one of intake and exhaust valves in accordance with the operational state of the internal combustion engine, and an air-fuel ratio control means capable of controlling the switching of the air-fuel ratio of an air-fuel mixture supplied to the engine to a richer level or a leaner level more than a theoretical air-fuel ratio, wherein the air-fuel ratio control means enriches the air-fuel ratio of the air-fuel mixture for a predetermined period when the valve timing is changed by the valve timing changing means and the air-fuel ratio of the air-fuel mixture is controlled to be at the leaner level than the theoretical air-fuel ratio.

With the above arrangement, when the valve timing is changed by the valve timing changing means while the air-fuel ratio of the air-fuel mixture is controlled to be at the leaner level than the theoretic air-fuel ratio, the air-fuel ratio of the air-fuel mixture is enriched for the predetermined period by the air-fuel ratio control means. Therefore, it is possible to prevent a misfiring, a knocking and an unstable combustion state generated when the valve timing is switched during a lean-burn control while enhancing the specific fuel consumption, thereby providing an effect enabling of a reduction in emission and an enhancement in drivability.

In the above first feature, the control system includes an ignition time point changing means for changing the time point of ignition of the engine in accordance with the valve timing resulting from the changing by the valve timing changing means, wherein the ignition time point changing means can control the time point of ignition of the engine to be an ignition time point corresponding to the valve timing provided after the changing via a value between the ignition time point corresponding to the valve timing before the changing and the ignition time point corresponding to the valve timing after the changing, when the valve timing is changed by the valve timing changing means.

In addition, to achieve the first object, according to a second aspect and feature of the present invention, there is provided a control system in an internal combustion engine, comprising a valve timing changing means for changing the valve timing of at least one of intake and exhaust valves in accordance with the operational state of the internal combustion engine, and an ignition time point changing means for changing the time point of ignition of the engine in accordance with the valve timing changed by the valve timing changing means, wherein the ignition time point changing means controls the time point of ignition of the engine to be an ignition time point corresponding to the valve timing provided after the changing via a value between the ignition time point corresponding to the valve timing before the changing and the ignition time point corresponding to the valve timing after the changing, when the valve timing is changed by the valve timing changing means.

With the above arrangement, when the valve timing is changed by the valve timing changing means, the time point of ignition of the ignition means is switched to the ignition time point corresponding to the valve timing provided after the changing via the value between the ignition time point corresponding to the valve timing before the changing and the ignition time point corresponding to the valve timing after the changing. Therefore, it is possible to reduce the torque shock due to a misfiring during changing of the valve timing, thereby enhancing the drivability.

To achieve the second object, according to a third aspect and feature of the present invention, there is provided a control process in an internal combustion engine in which the target air-fuel ratio can be changed to be at a stoichiometric level and a lean level and which is the control process for the internal combustion engine equipped with a ternary catalyst for purifying an exhaust gas, wherein when the level of the target air-fuel ratio is changed from the lean level to the stoichiometric level, it is changed to the stoichiometric level via a level richer than the stoichiometric level.

With the above structure, an excessive amount of $O_2$ stored within the ternary catalyst during a lean operation can be immediately discharged to restore an $NO_x$ converting ability of the ternary catalyst to effectively prevent the discharge of $NO_x$ to the open air. Moreover, the conventional ternary catalyst can be used as it is without using the $NO_x$ occluding-type exhaust emission control catalyst. This is convenient in durability and cost aspects.

In the third feature, ideally, a target air-fuel ratio in a state further richer than the stoichiometric level and a time of continuation of such state can be determined based on a time of continuation of the latest lean operation as well as a load and a number of revolutions of the internal combustion engine during the lean operation.

The above and other objects, features and advantages of the invention will become apparent from the following description of the preferred embodiments taken in conjunction with the accompanying drawings.

BRIEF DESCRIPTION OF THE DRAWINGS

FIGS. 1 to 14 illustrate a first embodiment of the present invention, wherein

FIG. 1 is a diagrammatic illustration of the entire arrangement of a control system in an internal combustion engine;

FIG. 2 is a diagram illustrating one example of a lean-burn control range;

FIG. 3 is a flow chart illustrating a portion of a valve-timing switching process;

FIG. 4 is a flow chart illustrating another portion of the valve-timing switching process;

FIG. 5 is a diagram illustrating one example of a valve-timing switching load table;

FIG. 6 is a flow chart illustrating a procedure for calculating an ignition time point θIG;

FIG. 7 is a diagram illustrating one example of high-speed and low-speed valve timing θIG maps;

FIG. 8 is a flow chart for a procedure for calculating a corrected lean-burn correcting factor KLSAFM;

FIG. 9 is a flow chart for a KOBJ calculation shown in FIG. 8;

FIG. 10 is another portion of the flow chart for the KOBJ calculation shown in FIG. 8;

FIG. 11 is still another portion of the flow chart for the KOBJ calculation shown in FIG. 8;

FIG. 12 is a diagram illustrating one example of a KLSAFM table;

FIG. 13 is a diagram illustrating one example of a THSLB table;

FIG. 14 is a diagram illustrating one example of advance and retard limits of the ignition time point θIG with respect to the air-fuel ratio;

FIGS. 15 to 19 illustrate a second embodiment of the present invention, wherein

FIG. 15 is a diagrammatic illustration of the entire arrangement of an air-fuel ratio control system in an internal combustion engine;

FIG. 16 is a first section of a flow chart for explaining an air-fuel ratio switching control;

FIG. 17 is a second section of the flow chart for explaining the air-fuel ratio switching control;

FIG. 18 is a time chart illustrating a variation in target air-fuel ratio during switching from lean level to stoichiometric level; and FIG. 19 is a graph illustrating the amount of discharged $NO_x$ during switching from lean level to stoichiometric level.

DETAILED DESCRIPTION OF THE PREFERRED EMBODIMENTS

The present invention will now be described by way of a first embodiment shown in FIGS. 1 to 14.

Figure 1:
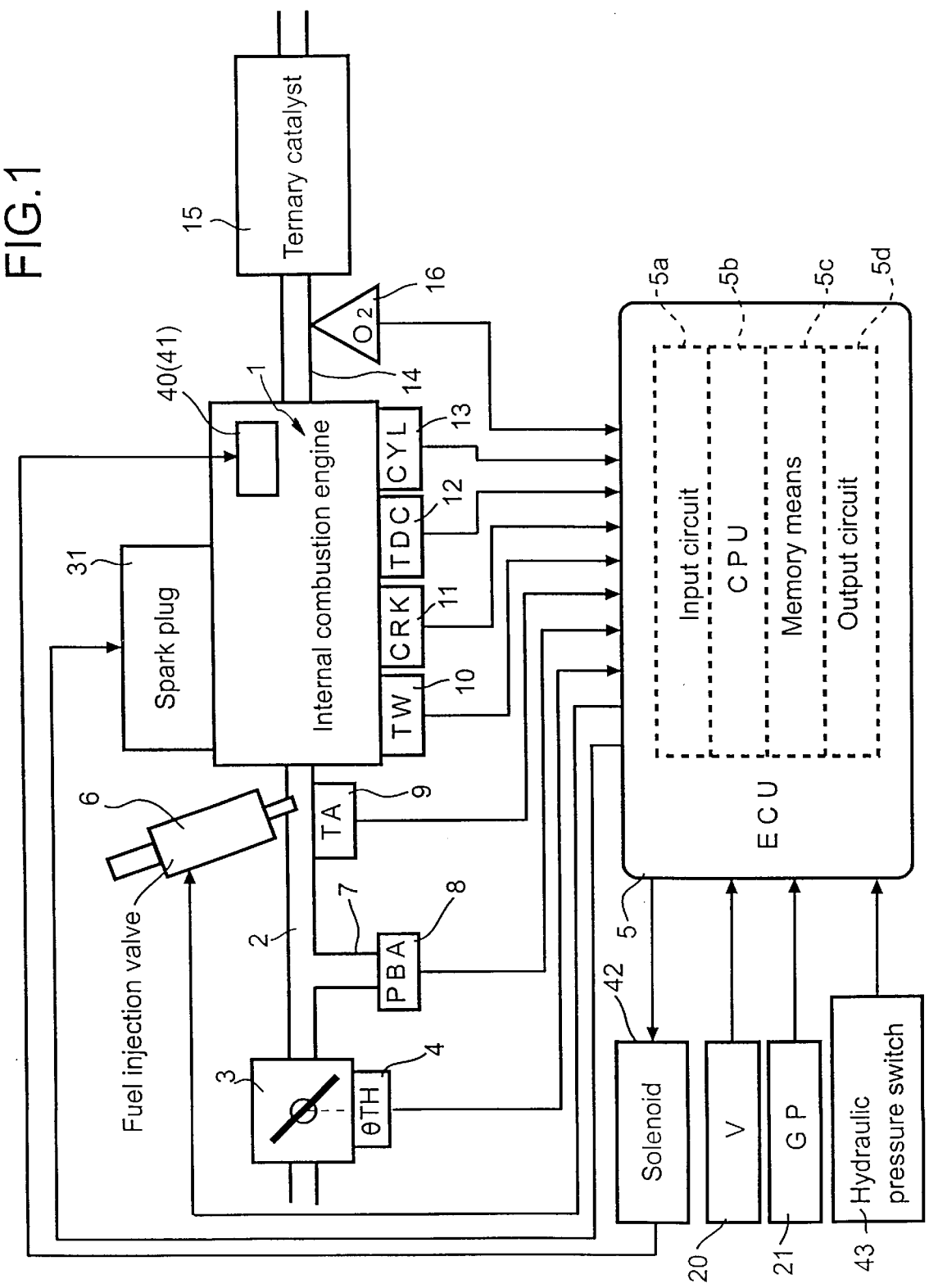

FIG. 1 is a diagrammatic illustration of the entire arrangement of an internal combustion engine 1 (hereinafter referred to as engine) and a control system of the engine according to the first embodiment of the present invention. A throttle valve 3 is disposed in the middle of an intake pipe 2 of the engine 1. A throttle valve opening degree ($\theta TH$) sensor 4 is connected to the throttle valve 3 and outputs an electric signal depending upon the opening degree of the throttle valve 3 to an electronic control unit 5 (hereinafter referred to as ECU).

A fuel injection valve 6 is provided for each of cylinders between the engine 1 and the throttle valve 3 and at a location slightly upstream of an intake valve (not shown) in the intake pipe 2. Each of the injection valves is connected to a fuel pump (not shown) and also electrically connected to ECU 5, so that the opening time of the fuel injection valve 6 is controlled in response to a signal from the ECU 5.

A spark plug 31 is provided for each of the cylinders in the engine 1 and connected to the ECU 5 via a driving circuit (not shown), so that the ignition timing $\theta IG$ of the spark plug 31 is controlled by the ECU 5.

On the other hand, an intake pipe internal absolute pressure (PBA) sensor 8 is provided immediately downstream of the throttle valve 3 via a pipe 7, and an absolute pressure signal converted to an electric signal by the absolute pressure sensor 8 is supplied to the ECU 5. An intake air temperature (TA) sensor 9 is mounted downstream of the absolute pressure sensor 8 for detecting an intake air temperature TA to output a corresponding electric signal to the ECU 5.

An engine water temperature (TW) sensor 10 comprised of thermister or the like is mounted to a body of the engine 1 for detecting an engine water temperature (cooling-water temperature) TW to output a corresponding electric signal to the ECU 5.

Mounted around a cam shaft or a crankshaft (not shown) of the engine 1 are a cylinder discriminating sensor 13 (hereinafter referred to as CYL sensor) for outputting a signal pulse (hereinafter referred to as CYL signal pulse) at a predetermined crank angle position of a particular cylinder of the engine 1, a TDC sensor 12 for generating a TDC signal pulse at a crank angle position (at every crank angle of 180° in a 4-cylinder engine) before the predetermined crank angle with respect to a top dead center (TDC) at the start of a suction stroke of each cylinder, and a crank angle sensor 11 (hereinafter referred to as CRK sensor) for generating one pulse (hereinafter referred to as CRK signal pulse) in a cycle of a given crank angle (e.g., 30°) shorter than a cycle of the TDC signal pulse. The CYL signal pulse, the TDC signal pulse and the CRK signal (crank angle signal) pulse are supplied to the ECU 5.

A ternary catalyst 15 is disposed in an exhaust pipe 14 of the engine 1 to convert HC, CO, $NO_x$ and the like in an exhaust gas. An oxygen concentration sensor 16 (hereinafter referred to as $O_2$ sensor 16), as an air-fuel ratio sensor, is mounted in the exhaust pipe 14 and upstream of the ternary catalyst 15. The $O_2$ sensor 16 detects a concentration of oxygen in the exhaust gas to output an electric signal corresponding to a detected value to the ECU 5. In this embodiment, the oxygen concentration sensor 16 is used as the air-fuel ratio sensor, but the air-fuel ratio sensor need not be limited to the oxygen concentration sensor 16.

Also connected to the ECU 5 are various sensors such as a vehicle speed sensor 20 for detecting a travel speed V of a vehicle equipped with the engine 1, and a gear ratio sensor 21 for detecting a gear ratio (a gear position GP) of a transmission of the vehicle. Detection signals are supplied from these sensors to the ECU 5. The gear ratio may be obtained based on the vehicle speed V and an engine revolution number NE.

The engine 1 includes a valve timing switching mechanism 40 capable of switching a valve timing including an opening time point and a lift amount of each of the intake and exhaust valves (not shown) between two stages of a high-speed valve timing suitable in a high-speed rotational range of the engine and a low-speed valve timing suitable in a low-speed rotational range. When the high-speed valve timing is selected, the two intake valves are operated for an opening period of time and in a lift amount suitable for a relatively large number of revolutions of the engine, and when the low-speed valve timing is selected, one of the two intake valves is operated for an opening period of time and in a lift amount suitable for a relatively small number of revolutions of the engine, and the other intake valve is operated at a shorter opening period of time and in a smaller lift amount. The exhaust valves are operated in the same manner as the intake valves.

The valve timing switching mechanism 40 switches the valve timing via hydraulic pressure, and includes a solenoid valve 41 for switching the hydraulic pressure, a solenoid 42 for controlling the switching of the solenoid valve 41, and a hydraulic pressure switch 43 which is turned ON, when the hydraulic pressure is lower than a predetermined value, and which is turned OFF when the hydraulic pressure is higher than the predetermined value. The solenoid 42 and the hydraulic pressure 43 are connected to the ECU 5. A detection signal from the hydraulic pressure switch 43 is supplied to the ECU 5 which controls the solenoid valve 41 to control the switching of the valve timing. The controlling of the solenoid valve by the ECU 5 is described below with reference to FIGS. 3 and 4.

The ECU 5 is comprised of an input circuit 5a having functions to arrange the wave form of each of the input signals from the various sensors, to correct the voltage level to a desired level, and to convert an analog signal value into a digital signal value, a central processing unit 5b (hereinafter referred to as CPU), a memory means 5c for storing various processing programs carried out in the CPU 5b and results of the processings and the like, and an output circuit 5d for supplying driving signals to the fuel injection valves 6 and the solenoid 42 of the solenoid valve 41 of the valve timing switching mechanism 40, and so on.

The CPU 5b discriminates various operational states of the engine such as a feedback control operational range and an open-loop control operational range and the like depending upon the concentration of oxygen in an exhaust gas, and arithmetically processes a fuel injection time TOUT of the fuel injection valve 6 synchronizing with the TDC signal pulse, according to the following equation:

$$TOUT = TI \times KLSAFM \times KO2 \times K1 + K2$$

In the above equation, TI designates a basic time of fuel injection determined in accordance with a basic amount of fuel, specifically, the engine revolution number NE and an intake pipe internal absolute pressure PBA. A TI map is stored in the memory means 5c in order to determine this TI value.

KLSAFM is a corrected lean-burn correcting factor after correction of the volume efficiency with respect to a lean-burn correcting factor KLSAF set at a value smaller than 1.0 in predetermined operational states of the engine 1 and the vehicle. A method for calculating this corrected lean-burn correcting factor KLSAFM will be described later with reference to FIG. 8.

Figure 2:
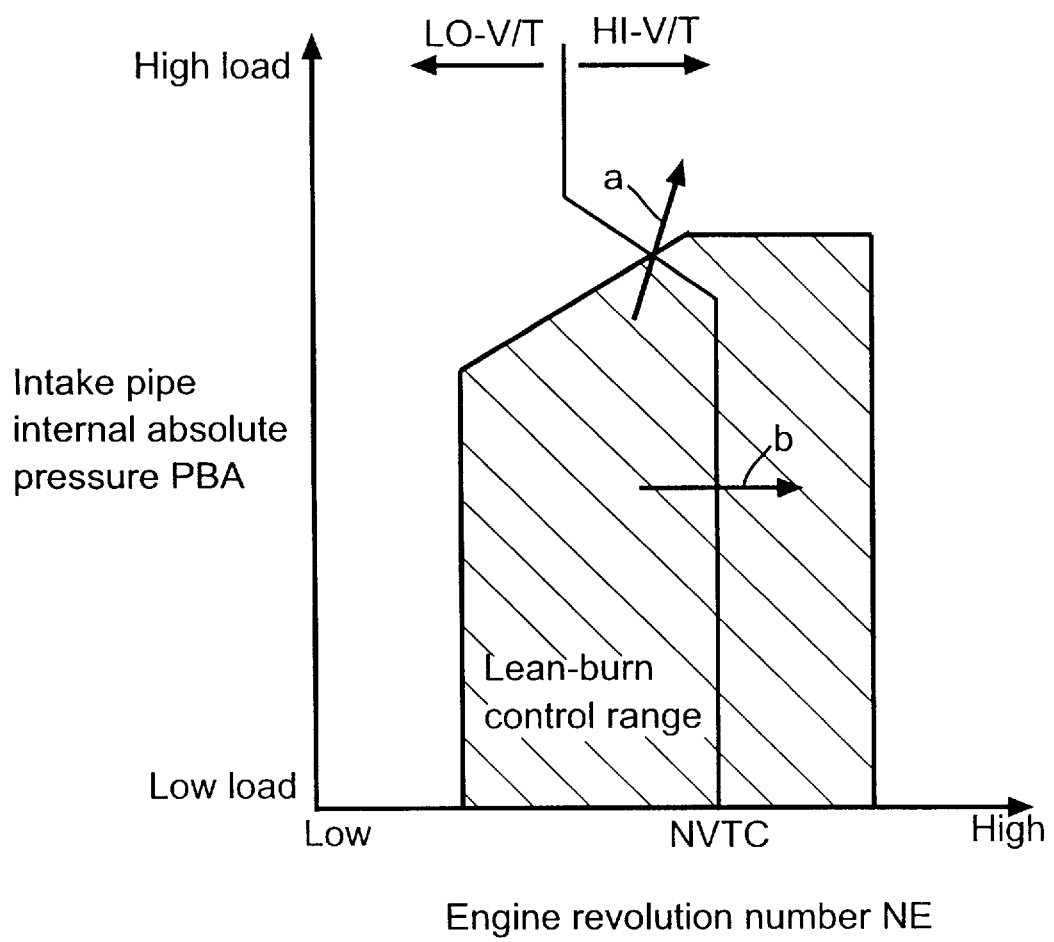

FIG. 2 is a diagram illustrating one example of a lean-burn control range. As shown in FIG. 2, the lean-burn control range is established in accordance with the operational state of the engine 1 (e.g., the intake pipe internal absolute pressure PBA and the engine revolution number NE). When the operational state of the engine 1 is in the lean-burn control range, the lean-burn correcting factor KLSAFM is set at a value smaller than 1.0 which is previously set as described above. In this embodiment, the arrangement is such that the switching-over between the low-speed valve timing and the high-speed valve timing can be achieved even in the lean-burn control range. This provides a further enhancement in the specific fuel consumption.

KO2 designates an air-fuel ratio correcting factor calculated based on an output from the $O_2$ sensor 16, and is set so that during the feedback control of the air-fuel ratio, an air-fuel ratio (a concentration of oxygen) detected by the $O_2$ sensor 16 is identical with a theoretical air-fuel ratio. During the open-loop control and during the lean-burn control, KO2 is set at a learned value (a value offset from 1.0 provided in a steady state) obtained during a stoichiometric operation.

K1 and K2 are another correcting factor and another correcting variable, respectively, arithmetically processed in accordance with various engine parameter signals. Each of K1 and K2 is set at a value suitable to optimize characteristics such as a specific fuel consumption characteristic, an engine accelerating characteristic and the like depending upon the operational state of the engine.

A control processing carried out in the CPU 5b is described below.

Figure 3:
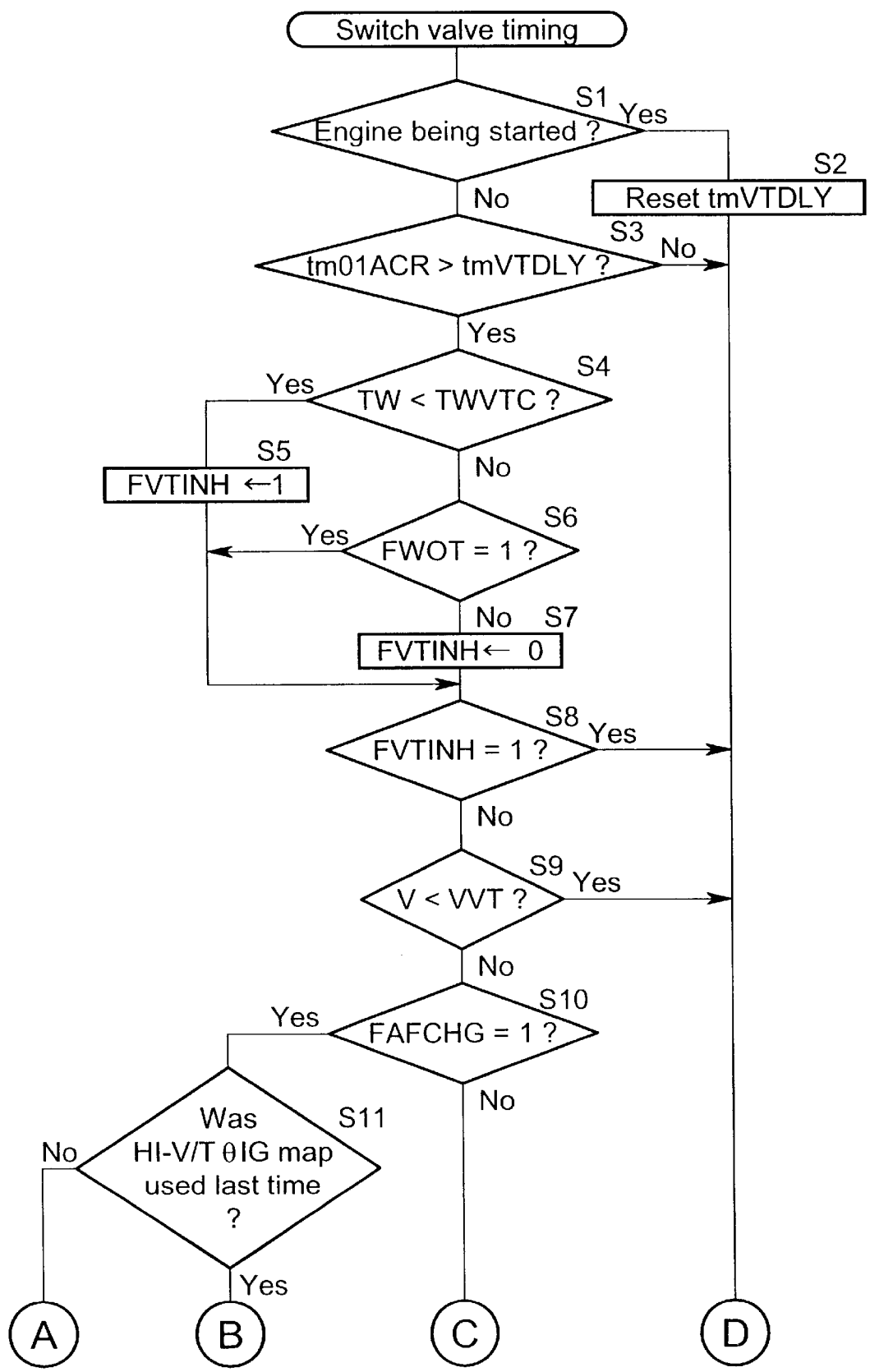
Figure 4:
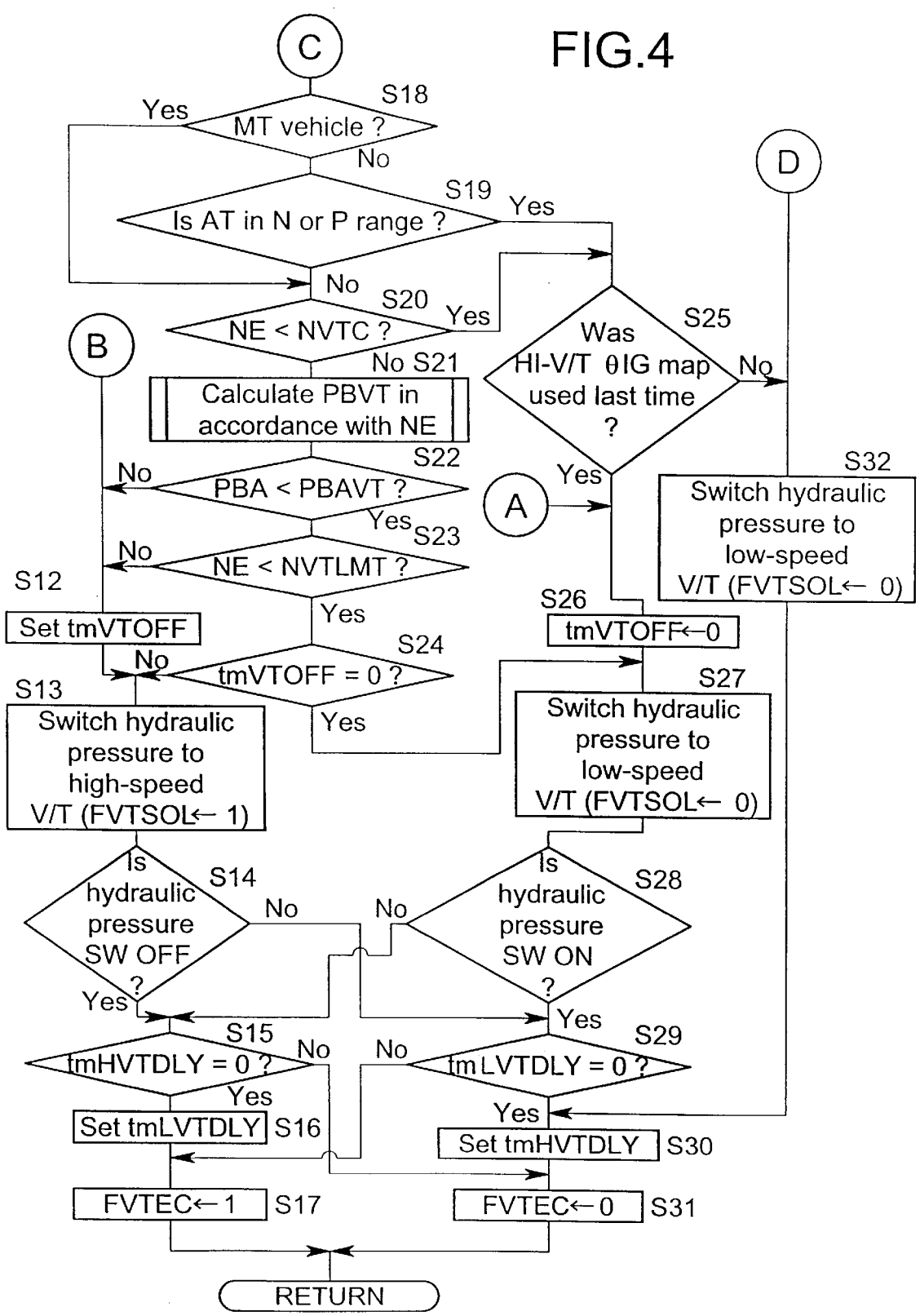

FIGS. 3 and 4 are flow charts illustrating the processing for switching the valve timing. This processing is carried out every time a TDC pulse signal is generated synchronously with the generated TDC pulse signal.

First, it is judged whether the engine 1 is being started, by the operation of starter switch (not shown) or by the engine revolution number NE (at step S1). If the engine is being started, a valve timing switching prohibiting timer tmVTDLY for prohibiting the switching of the valve timing for a predetermined time after the start is reset (at step S2), progressing to step S32 shown in FIG. 4. At step S32, the solenoid 42 for controlling the switching of the solenoid valve 41 is deenergized to switch the hydraulic pressure to provide the low-speed valve timing, while a solenoid flag FVTSOL representing the energization of the solenoid 42 by "1" is set at "0", proceeding to step S30 which will be described later.

On the other hand, when the engine is judged to have already been started at step S1, it is determined whether the counted value of a reference timer tm01ACR is larger than the counted value of the valve timing switching prohibiting timer tmVTDLY (at step S3). If tm01ACR≦tmVTDLY, i.e., when the predetermined period of time has not lapsed after the start of the engine, the processing proceeds to step S32. On the other hand, if tm01ACR>tmVTDLY, i.e., when the predetermined period of time has lapsed after the start of the engine, it is determined whether the temperature TW of engine water is lower than a preset valve-timing switching prohibiting water temperature TWVTC (at step S4).

If it is judged at step S4 that TW<TWVTC, a valve-timing switching prohibiting flag FVTINH representing the prohibition of the switching of the valve timing by "1" is set at "1", proceeding to step S8. If TW≧TWVTC, the processing proceeds to step S6.

At step S6, it is judged whether a WOT flag FWOT is "1". This flag indicates, by "1", a fully opened throttle valve operational range in which the throttle valve 3 is substantially fully opened. If FWOT=0, the valve-timing switching prohibiting flag FVTINH is set at "0" (at step S7), proceeding to step S8. On the other hand, if FWOT=1, step S7 is skipped to proceed to step S8.

At step S8, it is determined whether the valve-timing switching prohibiting flag FVTINH is "1". If FVTINH=1, i.e., when the switching of the valve timing is prohibited, the processing proceeds to step S32. On the other hand, if FVTINH=0, it is judged whether the vehicle speed V has reached a valve timing switching vehicle speed VVT (at step S9).

If it is judged at step S9 that V<VVT, the processing proceeds to step S32. If V≧VVT, the processing proceeds to step S10.

At step S10, it is judged whether an air-fuel ratio under-switching flag FAFCHG is "1". The air-fuel ratio under-switching flag FAFCHG indicates the fact that the air-fuel ratio (A/F) is switched, by "1". If FAFCHG=1, it is judged whether the ignition time point θIG was calculated using a θIG map (which will be described later with reference to FIG. 7) for the high-speed valve timing (HI-V/T) last time (at step S11). If the θIG map for the high-speed valve timing was used last time, the processing proceeds to step S12 shown in FIG. 4. If the θIG map for the high-speed valve timing was not used last time, the processing proceeds to step S26 which will be described later.

Here, if the air-fuel ratio is being switched, i.e., FAFCHG=1, and the θIG map for the high-speed valve timing was not used last time, i.e., a θIG map for a low-speed valve timing was used last time, it indicates a state (a shifting state "a" in FIG. 2) shifting from a low-speed valve timing-selected state within the lean-burn control range to a high-speed valve timing-selected state out of the lean-burn control range, i.e., a state in which the switching of the air-fuel ratio and the switching of the valve timing are simultaneously carried out. At this time, the processing proceeds from step S11 to step S26, at which the switching of the low-speed valve timing conducted by the last switching processing of the valve timing is carried out again, i.e., the last state is maintained. As a result, the simultaneous switching of the air-fuel ratio and the valve timing is prohibited, thereby making it possible to prevent a torque shock generated by the simultaneous switching to enhance the drivability.

Returning to FIG. 4, at step S12, a predetermined time TVTOFF is set in a solenoid off delay timer tmVTOFF for retarding, by a predetermined time, the timing (specifically, the timing for deenergizing the solenoid 42) for actually conducting the control of the switching of the valve timing from the high-speed valve timing to the low-speed valve timing, when this switching is conducted. Then, the solenoid 42 is energized to switch the hydraulic pressure to provide the high- speed valve timing, and "1" is set in the solenoid flag FVTSOL (at step S13). Thereafter, it is judged whether the hydraulic pressure switch (SW) 43 is OFF (at step S14). Here, the state of the hydraulic pressure switch 43 is judged in order to cope with the case where the solenoid 42 is broken down for any reason, whereby the hydraulic pressure is not switched to the high-speed valve timing, notwithstanding that the solenoid 42 is reliably energized.

If it is judged at step S14 that the hydraulic pressure switch 43 is OFF, i.e., the switched hydraulic pressure is high, it is judged whether a high-speed valve timing-switched delay timer tmHVTDLY for producing a predetermined time delay after energization of the solenoid 42, i.e., after switching of the valve timing to the high-speed valve timing is "0" (at step S15). If tmHVTDLY=0, a predetermined time TLVTDLY is set in a low-speed valve timing-switched delay timer tmLVTDLY for producing a predetermined time delay after deenergization of the solenoid 42, i.e., after switching of the valve timing to the low-speed valve timing (at step S16). A valve timing flag FVTEC (whose function will be described later at step S115 shown in FIG. 11) is set at "1" (at step S17), thereby completing this valve timing switching processing.

On the other hand, if it is judged at step S14 that the hydraulic pressure switch 43 is ON, i.e., the switched hydraulic pressure is low, the processing proceeds to step S29 which will be described later. If it is judged at step S15 that the delay timer tmHVTDLY is not equal to 0, the processing proceeds to step S31 which will be described later.

On the other hand, if it is judged at step S10 that FAFCHG=0, i.e., the air-fuel ratio is not being switched, it is judged whether the vehicle has a manual transmission (hereinafter referred to as MT vehicle) (at step S18). If the vehicle is not an MT vehicle, i.e., if the vehicle has an automatic transmission (hereinafter referred to as AT vehicle), it is judged whether the shift range is a neutral (N) range or a parking (P) range (at step S19). If the shift range is a drive (D) range or a rear (R) range, the processing proceeds to step S20. If the shift range is the neutral (N) range or the parking (P) range, the processing proceeds to step S25.

On the other hand, if it is judged at step S18 that the vehicle is the MT vehicle, step S19 is skipped to proceed to step S20.

Figure 5:
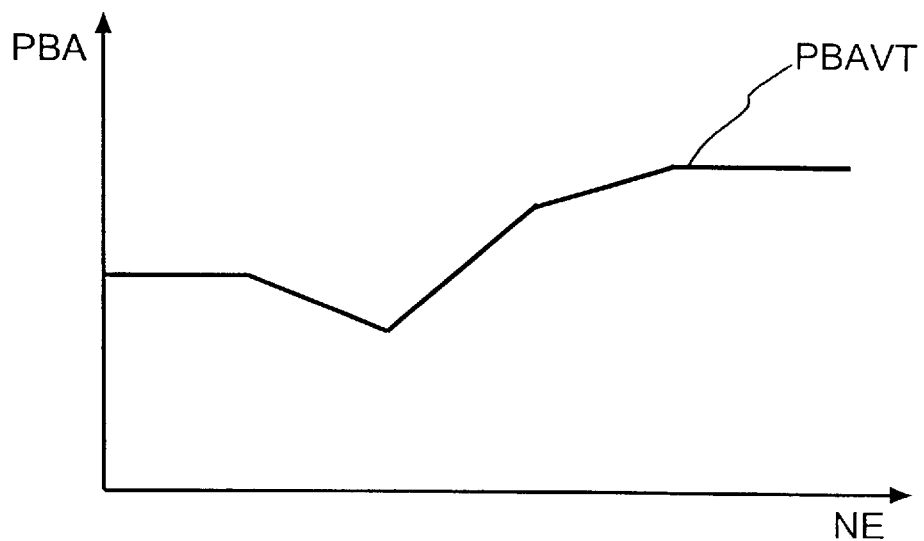

At step S20, it is judged whether the engine revolution number NE is smaller than a preset valve timing switching revolution number NVTC. If NE≧NVTC, a valve timing switching load table shown in FIG. 5 is searched in accordance with the engine revolution number NE to calculate an intake pipe internal absolute pressure PBAVT at the switching of the valve timing (at step S21). FIG. 5 is a diagram illustrating one example of the valve timing switching load table. As shown in FIG. 5, the table value of the intake pipe internal absolute pressure PBA is stored in this table in correspondence to the engine revolution number NE.

At subsequent step S22, it is judged whether the intake pipe internal absolute pressure PBA is smaller than the intake pipe internal absolute pressure PBAVT calculated at step S21. If PBA≧PBAVT, the processing proceeds to step S12. On the other hand, if PBA<PBAVT, it is judged whether the engine revolution number NE is smaller than a lower limit value NVTLMT of engine revolution number at which the switching of the valve timing is allowed to be carried out (at step S23).

If it is judged at step S23 that NE≧NVTLMT, the processing proceeds to step S12. If NE<NVTLMT, it is judged whether the counted value of the solenoid OFF delay timer tmVTOFF is "0" (at step S24).

If it is judged at step S24 that tmVTOFF is not equal to 0, the processing proceeds to step S13. On the other hand, if tmVTOFF=0, the processing proceeds to step S27 which will be described later.

At step S25, it is judged whether an ignition time point θIG was calculated using the high-speed valve timing θIG map last time. If the high-speed valve timing θIG map was not used last time, the processing proceeds to step S32. If the high-speed valve timing θIG map was used last time, the processing proceeds to step S26.

At step S26, "0" is set in the solenoid OFF delay timer tmVTOFF. At step S27, the solenoid 42 is deenergized to switch the hydraulic pressure to provide the low-speed valve timing, and the solenoid flag FVTSOL is set at "0". Then, at step S28, it is judged whether the hydraulic pressure switch 43 is ON.

Figure 7:
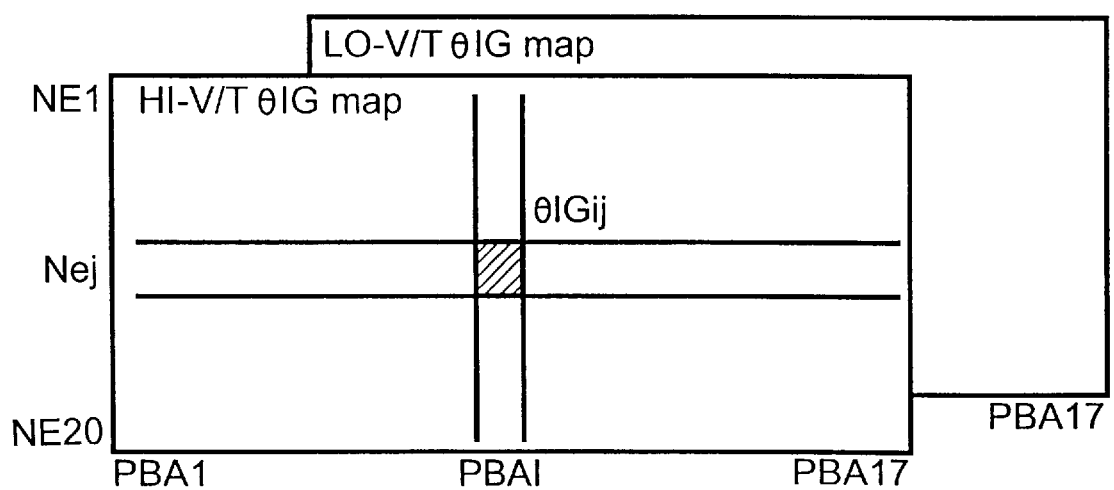

If it is judged at step S28 that the hydraulic pressure switch 43 is not ON, i.e., if the switched hydraulic pressure is high, the processing proceeds to step S15. On the other hand, if it is judged at step S28 that the hydraulic pressure switch 43 is ON, i.e., if the switched hydraulic pressure is low, the processing proceeds to step S29, at which it is judged whether the counted value of the time (i.e., the predetermined time TLVTDLY) has lapsed after switching of the valve timing from the high-speed valve timing to the low-speed valve timing, a low-speed valve timing (LO-V/T) θIG map shown in FIG. 7 is searched (at step S46) according to the engine revolution number NE and the intake pipe internal absolute pressure PBA. The map value θIGMAPL searched for is set as the ignition time point θIG (step S47), thus completing this θIG calculating process.

On the other hand, if it is judged at step S45 that tmLVTDLY≠0, i.e., if the predetermined time (i.e., the predetermined time TLVTDLY) has not lapsed after switching of the valve timing from the high-speed valve timing to the low-speed valve timing, or if it is judged at step S42 that tmHVTDLY≠0, i.e., the predetermined time HVTDLY has not lapsed after switching of the valve timing from the low-speed valve timing to the high-speed valve timing, the high-speed valve timing (HI-V/T) θIG map and the low-speed valve timing (LO-V/T) θIG map are searched according to the engine revolution number NE and the intake pipe internal absolute pressure PBA (at steps S48 and S49). An ignition time point θIG is calculated from map values θIGMAPH and θIGMAPL searched for by the following equation, thus completing this θIG calculating process.

$$\theta IG = (\theta IGMAPL + \theta IGMAPH)/2$$

In a transient state in which the valve timing shifts from the low-speed valve timing to the high-speed valve timing in the above manner, the ignition time point θIG is switched to an intermediate value between a value searched for from the low-speed valve over a predetermined period of time THVTDLY timing θIG map low-speed valve timing-switched delay timer tmLVTDLY is "0".

If it is judged at step S29 that tmLVTDLY≠0, the processing proceeds to step S17. If tmLVTDLY=0, a predetermined time THVTDLY is set in the high-speed valve timing-switched delay timer tmHVTDLY (at step S30), and the valve timing flag FVTEC is set at "0" (at step S31), thereby completing this valve timing switching processing.

Figure 6:
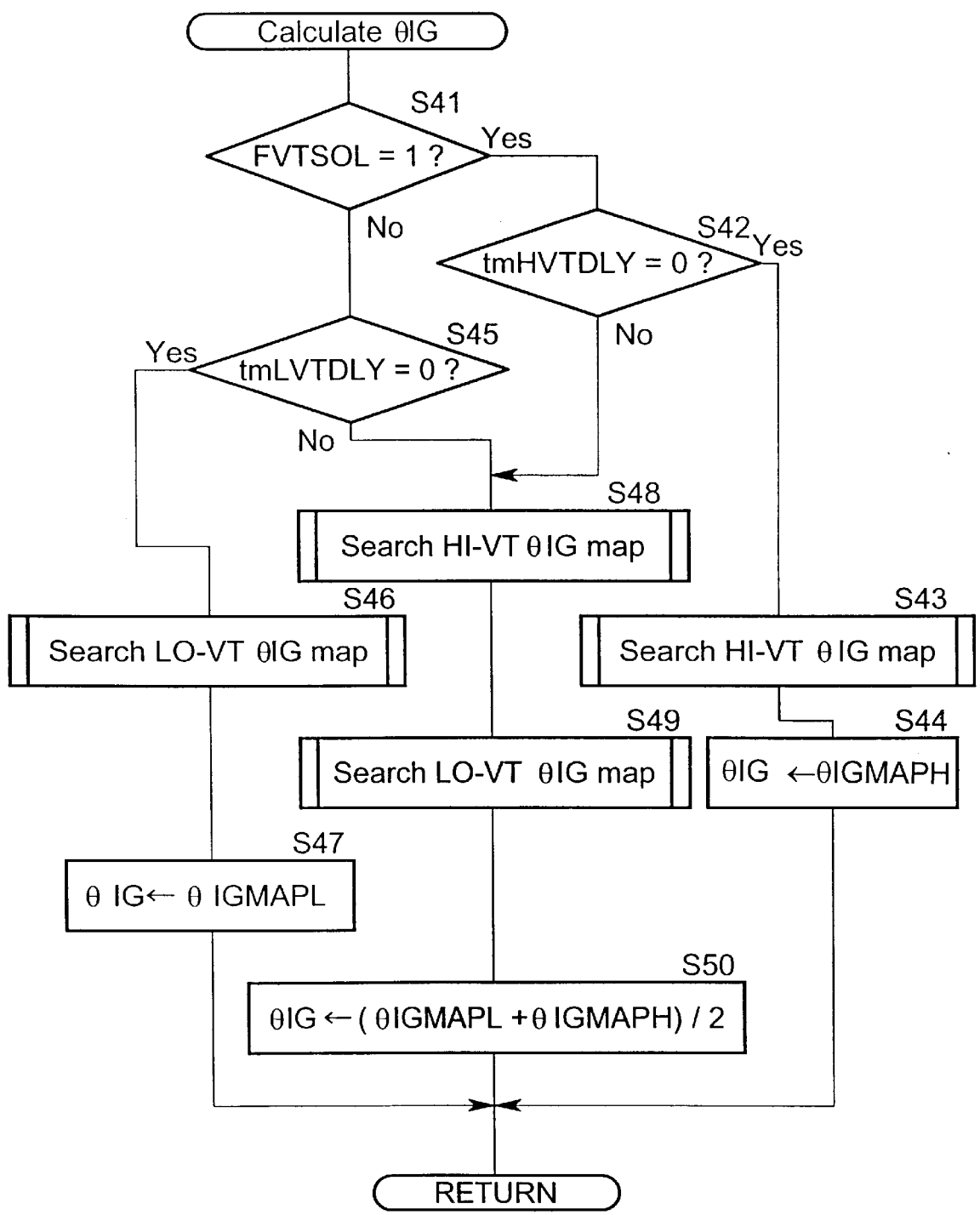

FIG. 6 is a flow chart illustrating a θIG calculating procedure for calculating the ignition time point θIG of the spark plug 31.

Referring to FIG. 6, first, it is judged whether the solenoid flag FVTSOL is "1" (at step S41). If FVTSOL=1, i.e., if the high-speed valve timing is selected, it is judged whether the counted value of the high-speed valve timing switched delay timer tmHVTDLY is "0" (at step S42).

If it is judged at step S42 that tmHVTDLY=0, i.e., if the predetermined time (i.e., the predetermined time THVTDLY) has lapsed after switching of the valve timing from the low-speed valve timing to the high-speed valve timing, a high-speed valve timing (HI-V/T) θIG map shown in FIG. 7 is searched for (at step S43) according to the engine revolution number NE and the intake pipe internal absolute pressure PBA. The map value θIGMAPH searched for is set as the ignition time point θIG (step S44), thus completing this θIG calculating process.

On the other hand, if it is judged at step S41 that FVTSOL=0, i.e., if the low-speed valve timing is selected, it is judged whether the low-speed valve timing-switched delay timer tmLVTDLY is "0" (at step S45). If tmLVTDLY=0, i.e., if the predetermined and a value searched for from the high-speed valve timing θIG map, i.e., a linear interpolation value. On the other hand, in a transient state in which the valve timing shifts from the high-speed valve timing to the low-speed valve timing, the ignition time point θIG is switched to an intermediate value over a predetermined period of time TLVTDLY between a value selected from the high-speed valve timing θIG map and a value selected from the low-speed valve timing θIG map, i.e., a linear interpolation value. Therefore, a torque shock due to a misfiring during switching of the valve timing can be reduced, thereby enhancing the drivability.

Figure 8:
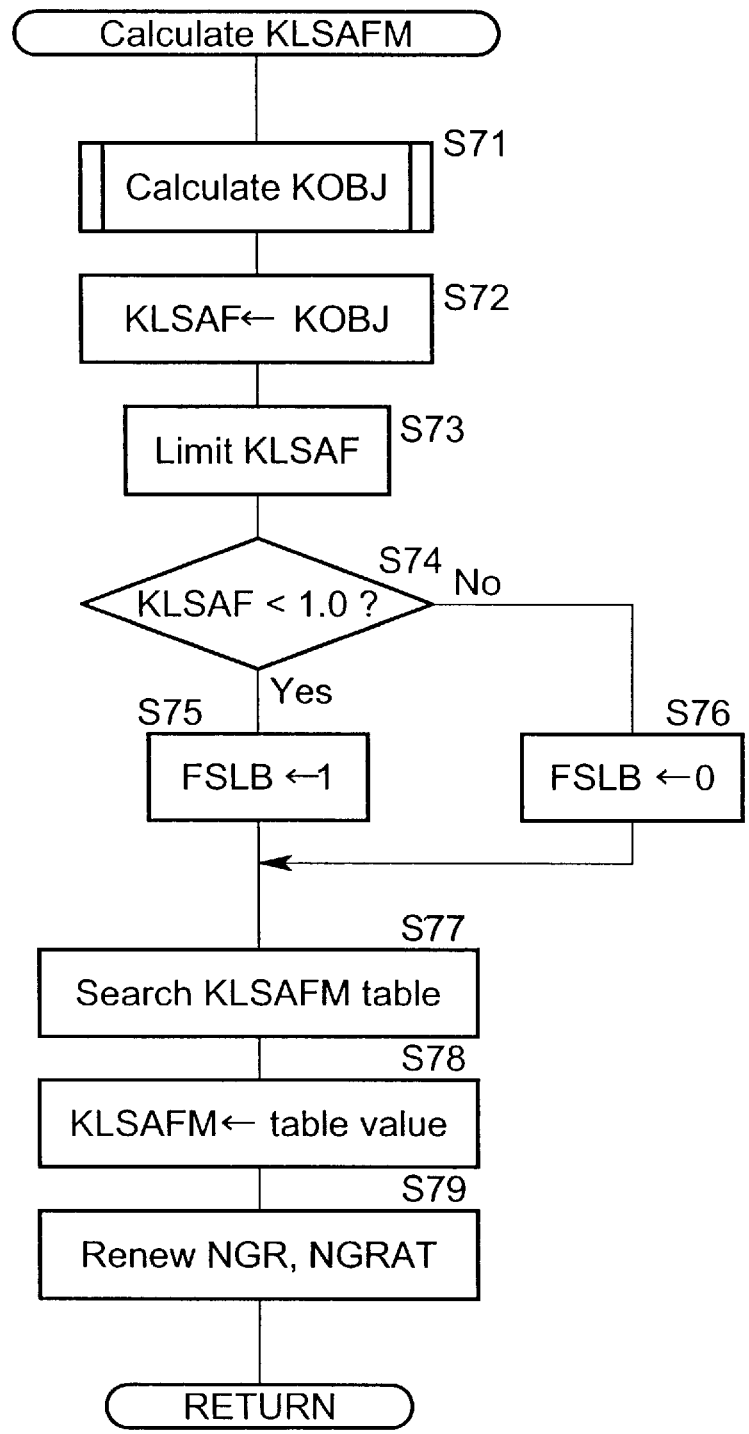

FIG. 8 is a flow chart for calculating a corrected lean-burn correcting factor KLSAFM. This calculation is carried out synchronously with the generation of the TDC signal pulse.

First, at step S71, the calculation of a target air-fuel ratio KOBJ is carried out. This processing will be described later with reference to FIGS. 9 to 11. The KOBJ value is defined so that it is proportional to the inverse number of the air-fuel ratio A/F and is an equivalent ratio equal to 1.0, when it is a theoretical air-fuel ratio. Therefore, during execution of the lean-burn control, the KOBJ value is set at a value smaller than 1.0.

Then, the target air-fuel ratio value KOBJ calculated at step S53 is set as the lean-burn correcting factor KLSAF (at step S53). At subsequent step S73, a KLSAF limit processing is carried out, proceeding to step S74. In the KLSAF limit processing, the lean-burn correcting factor KLSAF is gradually increased, when the engine is in a high-load operational range and when the increment of engine load is large. On the other hand, when the increment of load is small and KLSAF>KOBJ, a feedback control for increasing or decreasing the KLSAF value is controlled depending upon the amount of variation in rotation of the engine.

At step S74, it is judged whether the calculated KLSAF value is smaller than 1.0. If KLSAF<1.0, an SLB in-execution flag FSLB is set at "1" (at step S75). On the other hand, if KLSAF≧1.0, the flag FSLB is set at "0" (at step S76, proceeding to step S77).

Figure 12:
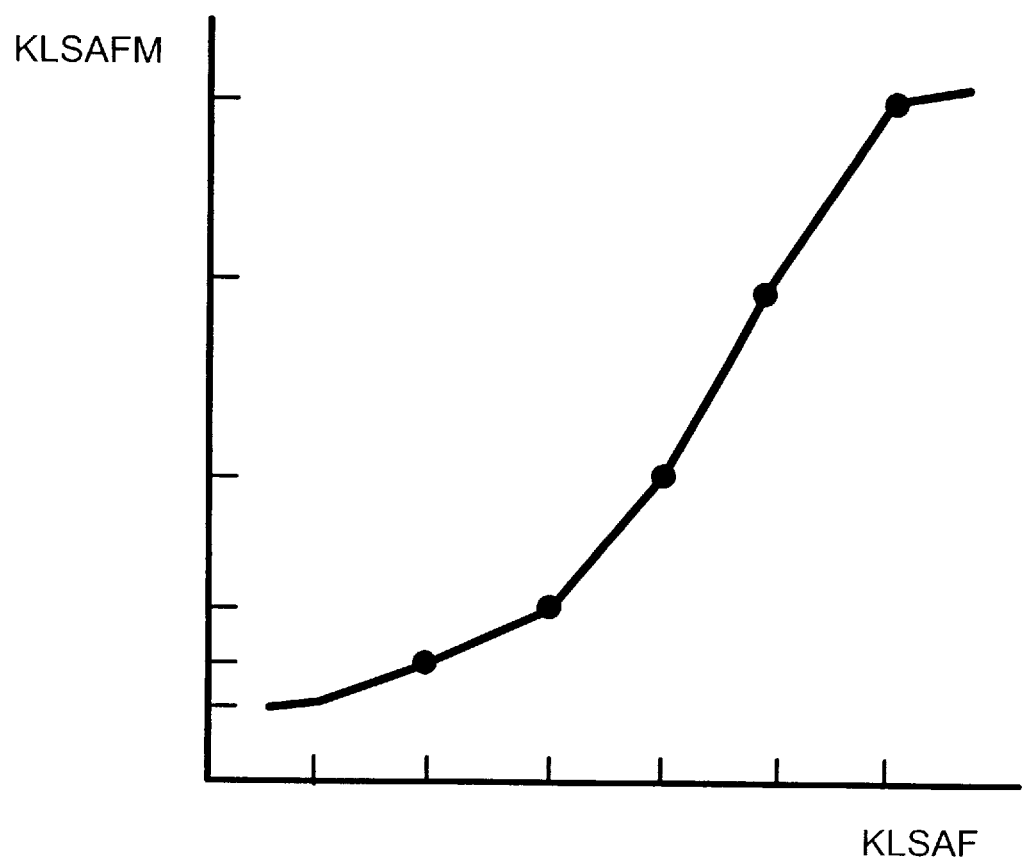

At steps S77 and S78, a KLSAFM table shown in FIG. 12 is searched in accordance with the KLSAF value in order to conduct the correction of the volume efficiency, and a corrected lean-burn correcting factor KLSAFM is calculated. Then, parameters NGR and NGRAT representing gear positions are renewed (at step S79), thus completing this processing. In the KLSAFM table shown in FIG. 12, the table value of the corrected lean-burn correcting factor KLSAFM is set so that the larger the KLSAF is, the larger the table value is.

Here, the correction of the volume efficiency is conducted in consideration of the fact that if the lean-burn correcting factor KLSAF is multiplied as it is, by the basic amount of fuel TI, the air-fuel ratio is deviated from a desired value, because during the lean-burn control, the fuel cooling efficiency is reduced, resulting in a decreased charging efficiency. That is, the map of the basic amount of fuel TI is established so that the theoretical air-fuel ratio is obtained. Therefore, during the lean-burn control, the KLSAF value is corrected so as to obtain a smaller correcting factor value, thereby calculating a corrected lean-burn correcting factor KLSAFM.

NGR at step S79 is a gear position parameter of the manual transmission (NGR=1 to 5), and NGRAT is a gear position parameter of the automatic transmission (NGR=1 to 4).

Figure 9:
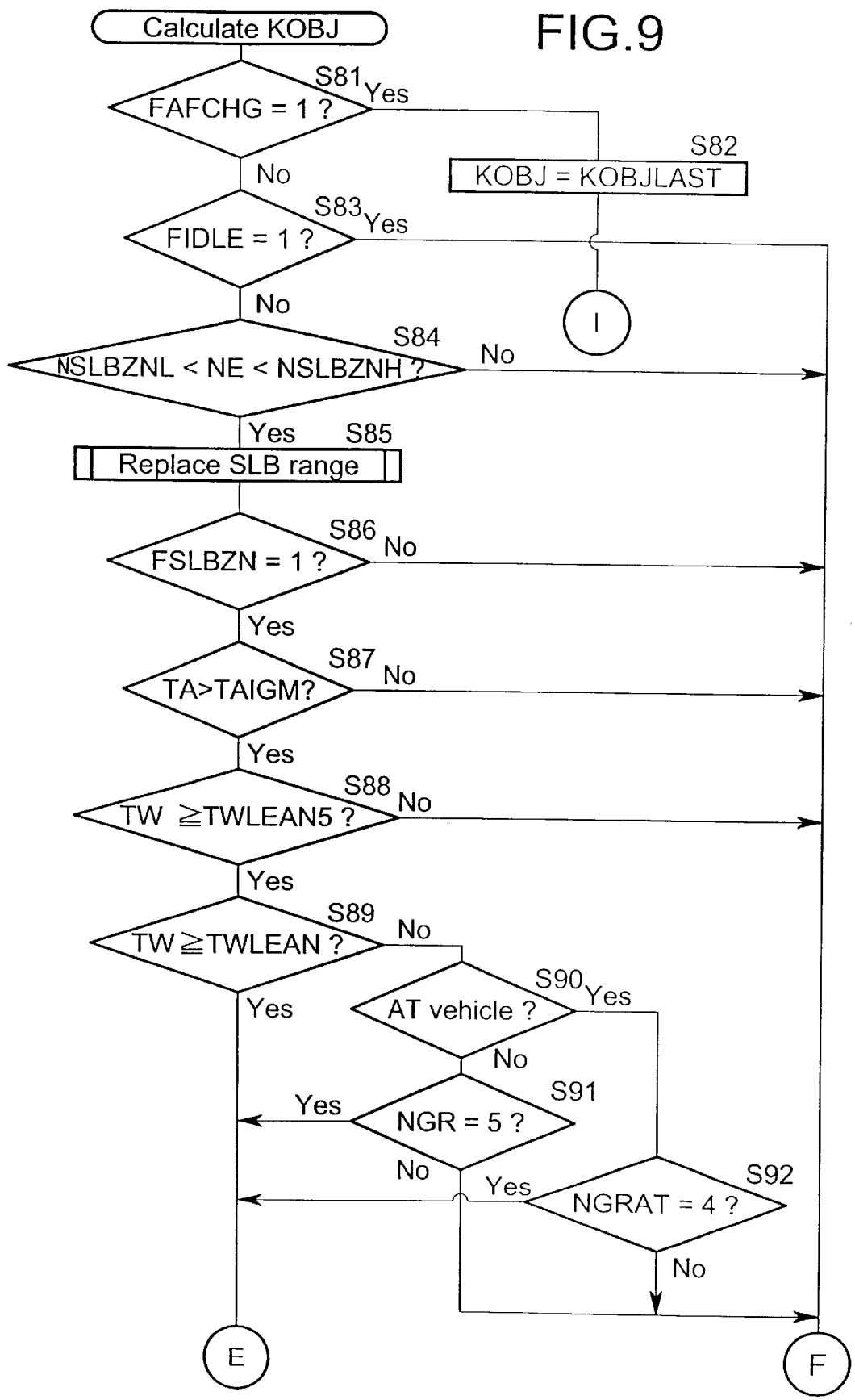
Figure 10:
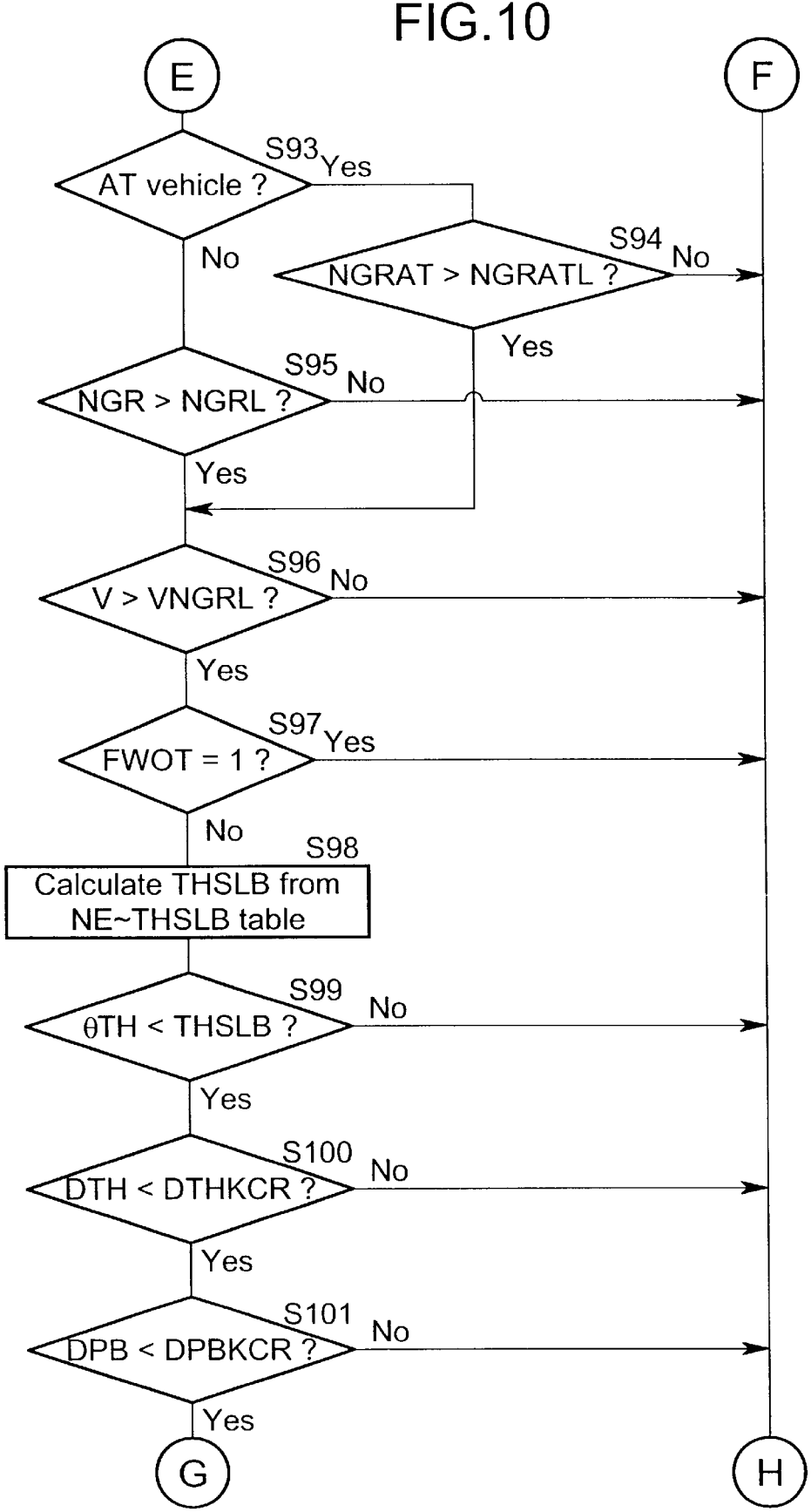
Figure 11:
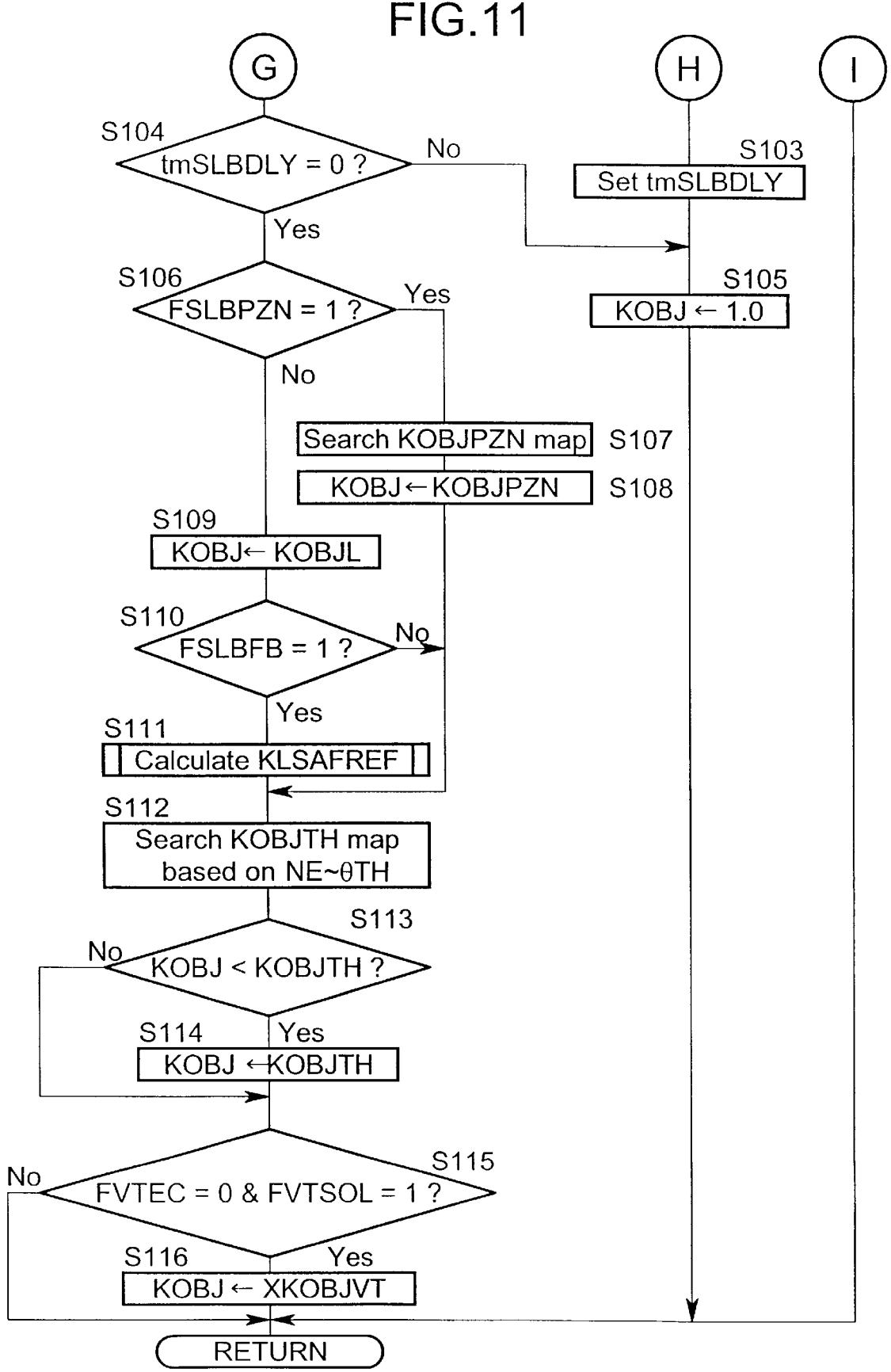

FIGS. 9 to 11 are flow charts for a KOBJ calculating process at step S71 shown in FIG. 8.

First, it is judged whether the air-fuel ratio under-switching flag FAFCHG is "1" (at step S81). If FAFCHG=1, the target air-fuel ratio KOBJ is set at a last target air-fuel ratio KOBJLAST calculated and stored last time (at step S82), thus completing this KOBJ calculating process.

On the other hand, if it is judged at step S81 that FAFCHG=0, an idle flag FIDLE indicating by "1" the fact that the engine is in an idle state is checked (at step S83). If FIDLE=0 indicating that the engine is not in the idle state, it is judged whether the engine revolution number NE is in a range between predetermined upper and lower limit values NSLBZNH and NSLBZNL (e.g., 4,000 rpm and 900 rpm) (at step S84). If FIDLE=1 indicating that the engine is in the idle state, or if NE≦NSLBZNL or NE≧NSLBZNH, the processing proceeds to step S103 shown in FIG. 11. If NSLBZNL<NE<NSLBZNH, the processing proceeds to step S85, at which a SLB range replacing process is carried out. In this process, the setting of an SLB high-load range flag FSLBPZN is carried out, which indicates, by "1", the fact that the engine is in a high-load range within an operational range (hereinafter referred to as SLB range) in which the lean-burn control is feasible.

Then, it is judged whether an in-SLB range flag FSLBZN indicating, by "1", that the engine is in the SLB range is "1" (at step S86). If FSLBZN=1 indicating that the engine is in the SLB range, it is determined whether the intake air temperature TA is higher than a predetermined intake air temperature TAIGM (e.g., -9° C.) (at step S87). If TA>TAIGM, it is judged whether the engine water temperature TW is equal to or higher than a predetermined water temperature TWLEAN5 (e.g., 70° C.) (at step S88). If the answer at any of steps S86 to S88 is NO, it is judged that the lean-burn control should not be carried out and processing proceeds to step S103. At step S103 shown in FIG. 11, a predetermined time TSLBDLY is set in a down-count timer tmSLBDLY, and the counting of this timer starts, and the target air-fuel ratio KOBJ is set at 1.0 (at step S105), thus completing this process.

If TW≧TWLEAN5 at step S88, it is further judged whether the engine water temperature TW is equal to or higher than a predetermined water temperature TWLEAN (>TWLEAN5) (at step S89). If TW≧TWLEAN, the processing immediately proceeds to step S93 shown in FIG. 10. If TW<TWLEAN, it is judged whether the vehicle is an AT vehicle (at step S90). If the vehicle is not the AT vehicle, i.e., if the vehicle is an MT vehicle, it is judged whether the gear position NGR is a fifth gear shift (at step S91). If the gear position NGR is the fifth gear shift, the processing proceeds to step S93. If the gear position NGR is not the fifth gear shift, the processing proceeds to step S103. If the vehicle is the AT vehicle, it is judged whether the gear position is a fourth gear shift (at step S92). If the gear position is the fourth gear shift, the processing proceeds to step S93. If the gear position is not the fourth gear shift, the processing proceeds to step S103.

At step S93, it is judged whether the vehicle is an AT vehicle. If the vehicle is not the AT vehicle, i.e., if the vehicle is an MT vehicle, it is judged whether the gear position NGR is a gear shift higher than a predetermined gear position NGRL (at step S95). If NGR≦NGRL, the processing proceeds to step S103. If NGR>NGRL, it is judged whether the vehicle speed V is higher than a predetermined vehicle speed VNGRL (at step S96). If V≦VNGRL, the processing proceeds to step S103. If V>VNGRL, the processing proceeds to step S97.

On the other hand, if the vehicle is the AT vehicle, the processing proceeds from step S93 to step S94, at which it is judged whether the gear position NGRAT is a gear shift higher than a predetermined gear position NGRATL. If NGRAT≦NGRATL, the processing proceeds to step S103. If NGRAT is larger than NGRATL, the processing proceeds to step S96.

Steps S93 to S96 ensure that the lean-burn control is not carried out depending upon the gear position or the vehicle speed (and the engaged state of a lock-up clutch).

Figure 13:
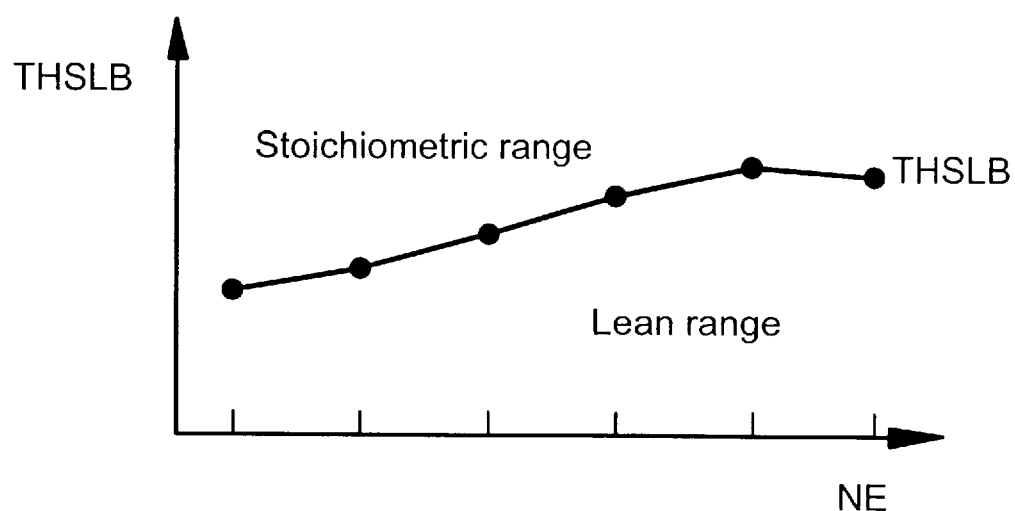

At step S97, it is judged whether the WOT flag FWOT is "1" meaning a fully opened throttle valve operational range. If FWOT=0, a THSLB table shown in FIG. 13 is searched in accordance with the engine revolution number NE to calculate a lean-burn control upper limit value THSLB of the throttle valve opening degree θTH (at step S98). Then, it is judged whether the detected throttle valve opening degree θTH is smaller than the upper limit value THSLB (at step S99). If θTH<THSLB, it is judged whether the amount DTH (=θTH(N)−θTH(N−1)) of variation in throttle valve opening degree θTH is smaller than a predetermined amount of variation DTHKCR (at step S100). If DTH<DTHKCR, it is judged whether the amount of variation DPB (=PBA(N)−PBA(N−1)) in intake pipe internal absolute pressure PBA is smaller than a predetermined amount of variation DPBKCR (at step S101). As a result, if the answer at any of steps S99 to S101 is NO, the processing proceeds to step S103, and the lean-burn control is not carried out.

If all of answers at steps S99 to S101 are YES, it is judged whether the value of the timer tmSLBDLY set at step S103 is "0" (at step S104 in FIG. 11). While tmSLBDLY>0, the processing proceeds to step S105, at which KOBJ is set at 1.0. If tmSLBDLY=0, it is judged whether the SLB high-load range flag FSLBPZN is "1" (at step S106). If FSLBPZN=1, indicating that the engine is in the high-load range within the SLB range, a KOBJPZN map is searched (at step S107). A target air-fuel ratio KOBJPZN at a high-load provided as a result of the searching is set as a target air-fuel ratio KOBJ (at step S108), proceeding to step S112.

If FSLBPZN=0 at step S106, the target air-fuel ratio KOBJ is set at a predetermined lower limit value KOBJL (at step S109), and it is judged whether an SLBF/B flag FSLBFB is "1" (at step S110). If FSLBFB=0, the processing proceeds to step S112. If FSLBFB=1, indicating that the feedback control of the KLSAF value is being carried out, a learned value KLSAFREF of the lean-burn correcting factor KLSAF is calculated using the following equation (at step S111) before proceeding to Step S112:

$$KLSAFREF = KLSCRF \times KLSAF(N)/A + (A - KLSCRF) \times KLSAFREF(N-1)/A$$

In the above equation, (N) and (N−1) are affixed in order to indicate the current value and the last value, respectively. A is a constant set, for example, at 10,000 (16 system), and KLSCRF is an annealing factor set at a value between 1 and A.

At step S112, a KOBJTH map (not shown) is searched in accordance with the throttle valve opening degree θTH and the engine revolution number NE in order to replace the target air-fuel ratio KOBJ, when a driver demands the acceleration of the vehicle by the operation of the accelerator pedal.

At subsequent step S113, it is judged whether the target air-fuel ratio KOBJTH searched for at step S112 is larger than the target air-fuel ratio KOBJ. If KOBJ<KOBJTH, the target air-fuel ratio KOBJ is replaced by the value KOBJTH searched for. On the other hand, if KOBJ≧KOBJTH, step S114 is skipped to proceed to step S115. At steps S113 and S114, the limiting of the target air-fuel ratio KOBJTH is carried out.

At step S115, it is judged whether the high-speed valve timing flag FVTEC is "0" and the solenoid flag FVTSOL is "1". If FVTEC=0 and FVTSOL=1, i.e., before a predetermined time THVTDLY lapses (FVTSOL=0) after the solenoid 42 is energized (FVTSOL=1) to cause the switched hydraulic pressure to be actually increased (the hydraulic pressure switch 43 is OFF), the target air-fuel ratio KOBJ is fixed to a previously set air-fuel ratio XKOBJVT (e.g., 14.7/18.0=0.82), i.e., the target air-fuel ratio KOBJ is enriched (at step S116), thus completing the KOBJ calculating process. On the other hand, if FVTEC=1 or FVTSOL=0 at step S115, this KOBJ calculating process is immediately finished.

Figure 14:
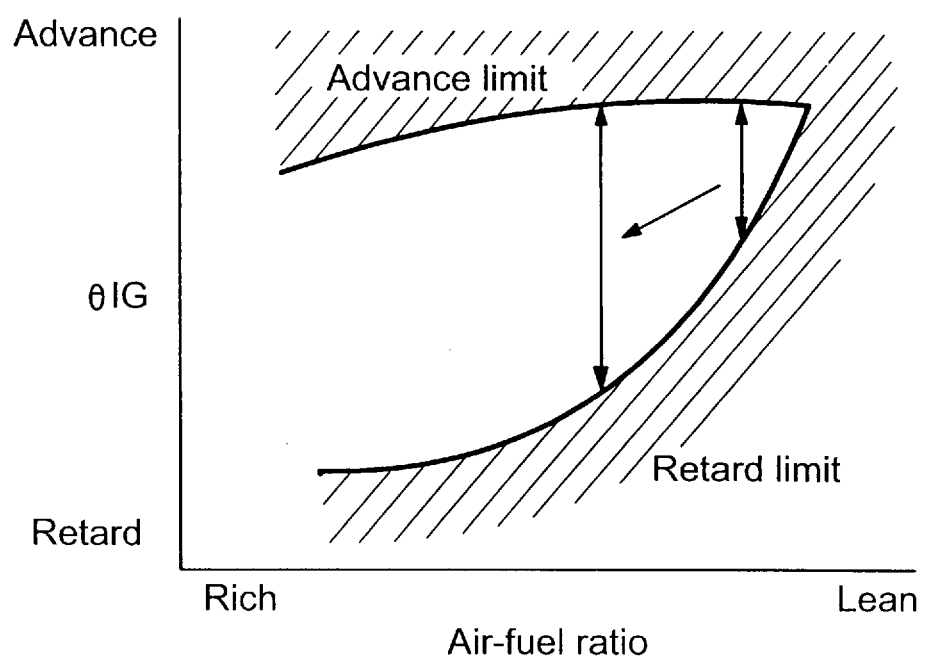

In this way, the air-fuel ratio is enriched, i.e., the correction for increasing the amount of fuel is carried out, so that the target air-fuel ratio KOBJ becomes the air-fuel ratio XKOBJVT during switching-over of the valve timing (e.g., when in the shifting state b shown in FIG. 2). Therefore, as shown in FIG. 14, the advance limit of the ignition time point θIG drops or lowers, while the retard limit lowers, whereby the control range of the ignition time point θIG can be widened. Thus, it is possible to prevent the misfiring and the unstable combustion state, thereby enhancing the drivability.

A second embodiment of the present invention will be described with reference to FIGS. 15 to 19.

Figure 15:
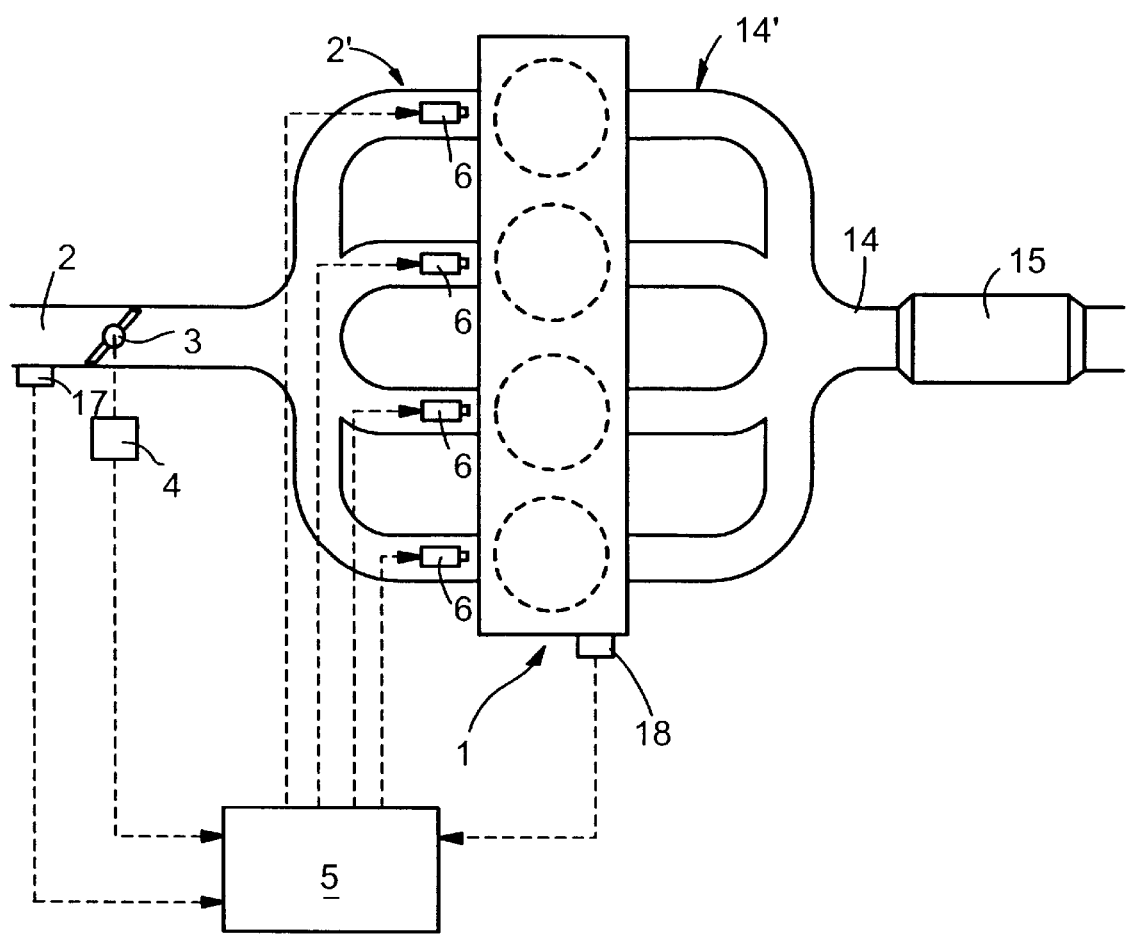

As shown in FIG. 15, the intake pipe 2 of the 4-cylinder engine 1 is connected to four cylinders through an intake manifold 2'. A throttle valve 3 is provided in the intake pipe 2 and connected to an accelerator pedal (not shown) for opening and closing movements. A signal from a throttle opening degree sensor 4 connected to the throttle valve 3 for detecting a throttle opening degree θTH is inputted to the ECU 5. An intake air amount sensor 17 for detecting an intake air amount Q is provided in the intake pipe 2, so that a signal from the intake air amount sensor 17 is inputted to the ECU 5. An engine revolution number sensor 18 is mounted in the engine 1 for detecting an engine revolution number NE based on the rotation of a crankshaft (not shown), so that a signal from the engine revolution-number sensor 18 is inputted to the ECU 5. Four fuel injection valves 6 are mounted in the intake manifold 2' in correspondence to the four cylinders. Each of the fuel injection valves 6 is connected to the ECU 5, so that the amount Ti of fuel injected from the fuel injection valve 6 is controlled. A ternary catalyst 15 for purifying an exhaust gas is mounted in an exhaust passage 14 which is connected to the engine 1 through the exhaust manifold 14'.

The ECU 5 map-searches for a target air-fuel ratio A/F based on the throttle opening degree OTH detected by the throttle opening degree sensor 4 and the engine revolution number NE detected by the engine revolution number sensor 18. In a usual operational range of the engine 1, the target air-fuel ratio A/F is set at 14.7 which is a stoichiometric value, i.e., a theoretical value. On the other hand, in a particular operational range such as a deceleration of the engine 1 or the like, the target air-fuel ratio A/F is remarkably thinned into a lean value and set, for example, at 23 to decrease the specific fuel consumption. The time point of switching from the lean level to the stoichiometric level of the target air-fuel ratio A/F and the time point of switching from the stoichiometric level to the lean level are determined based on a map made using, as parameters, the intake air amount Q detected by the intake air amount sensor 17 and the engine revolution number NE detected by the engine revolution number sensor 18.

When the target air-fuel ratio A/F is the theoretical air-fuel ratio, the ECU 5 determines an amount Ti of fuel injected by the fuel injection valves 6 in accordance with the intake air amount Q detected by the intake air amount sensor 17 and the engine revolution number NE detected by the engine revolution number sensor 18, so that such theoretic air-fuel ratio is obtained. On the other hand, when the target air-fuel ratio A/F is a value leaner than the theoretical air-fuel ratio, the ECU 5 determines an amount Ti of fuel injected, so that such lean target air-fuel ratio A/F is obtained.

Figure 16:
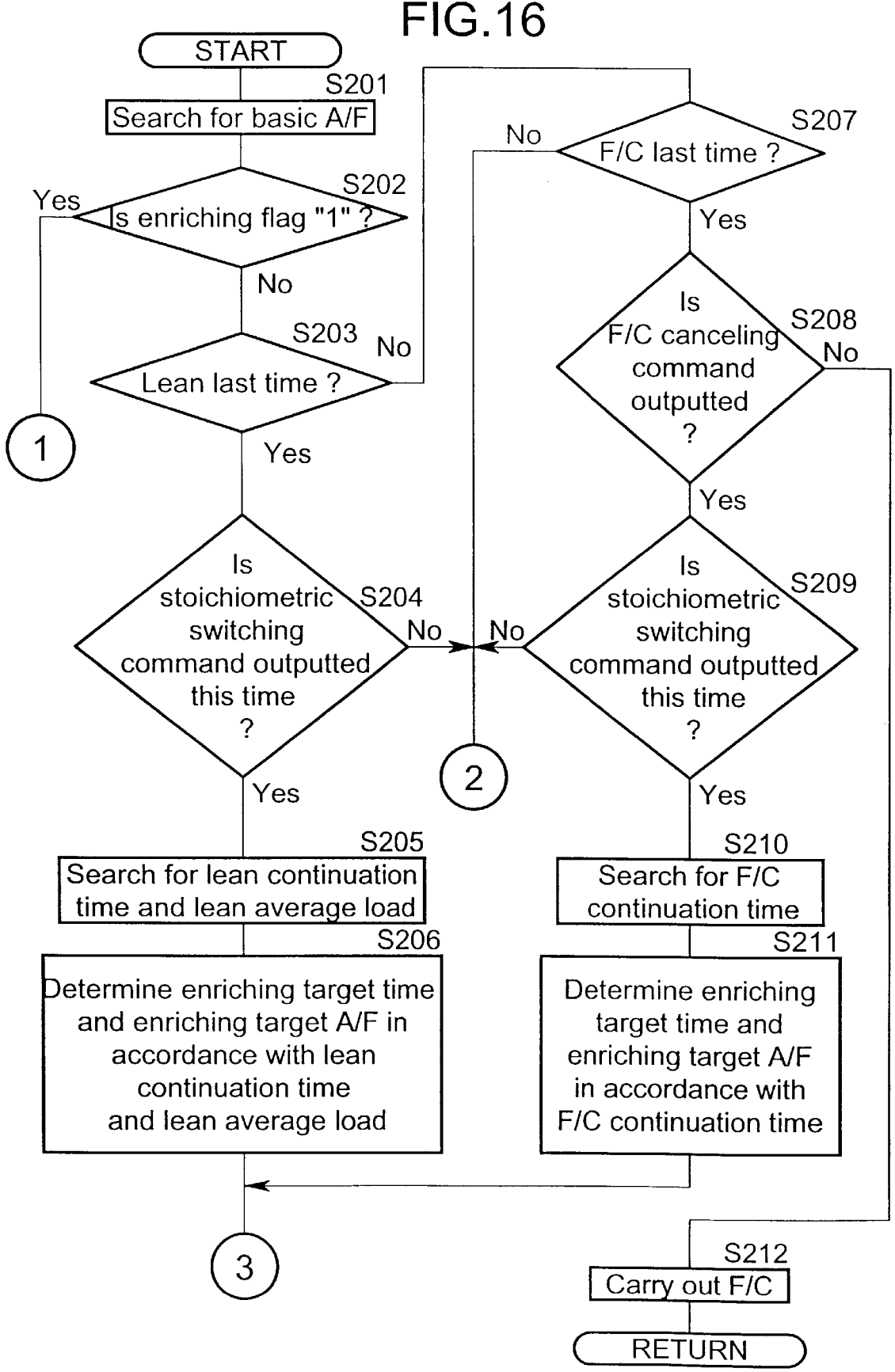
Figure 17:
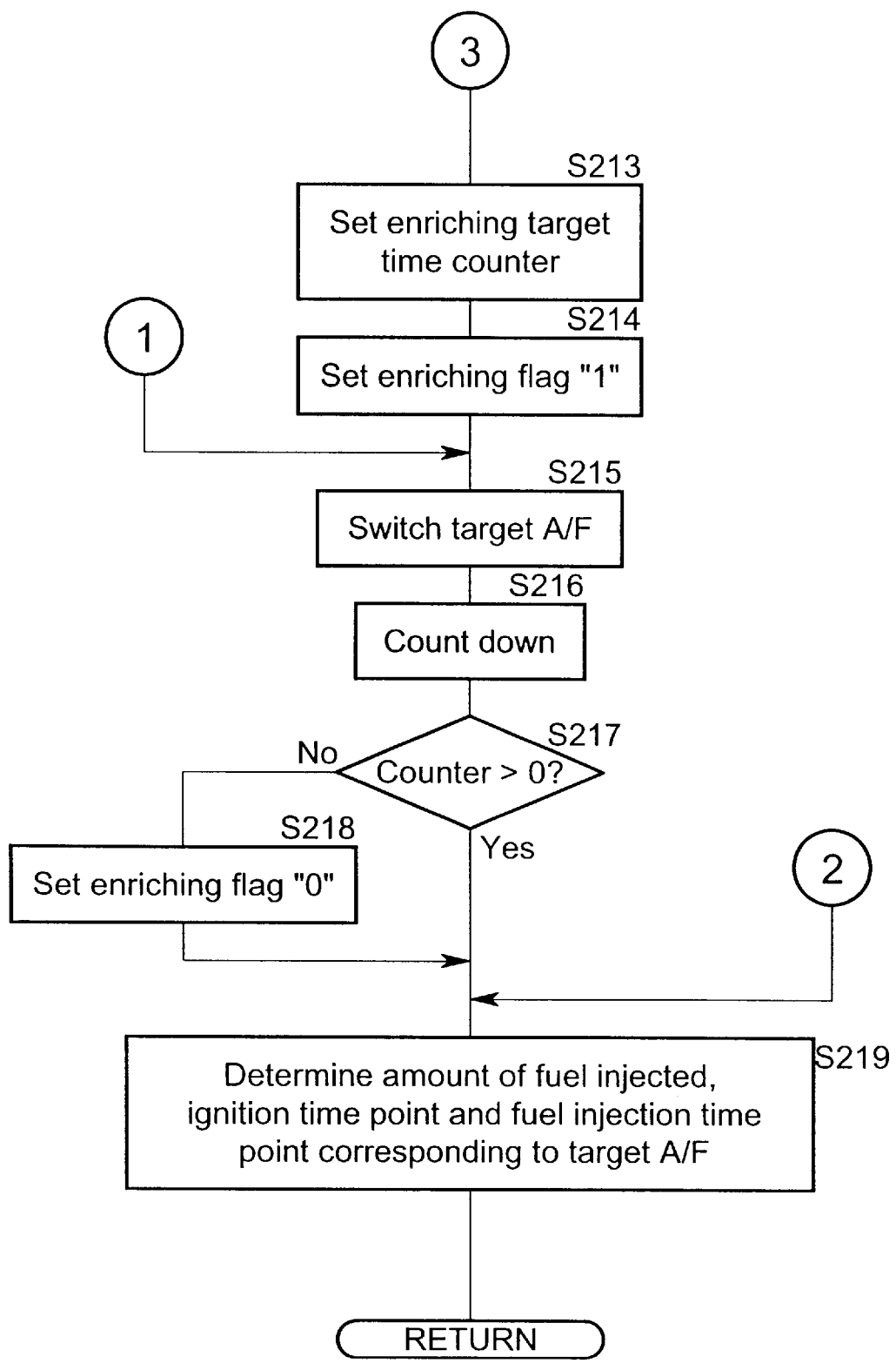

The control of the target air-fuel ratio A/F in switching from a lean state or a fuel-cut state to a stoichiometric state will be further described with reference to flow charts shown in FIGS. 16 and 17.

First, at step S201, a basic target air-fuel ratio A/F is map-searched for based on the throttle opening degree θTH and the engine revolution number NE. An enriching flag which will be described later is initially reset at "0" at step S202 and hence, the processing proceeds to step S203. If the target air-fuel ratio A/F is lean last time at step S203, the processing proceeds to step S204. If a stoichiometric switching command is outputted for the first time at step S204, i.e., if the switching from lean level to stoichiometric level is demanded at a command, the time of continuation of the lean operational state and an average load of the engine 1 and the engine revolution number NE for that time are searched for at step S205. Then, at step S206, an enriching target time and an enriching target air-fuel ratio are calculated based on the lean continuation time, the lean average load and the engine revolution number NE searched for at step S205. The lean average load can be presumed from the throttle opening degree θTH or the intake air amount Q.

The enriching target time and the enriching target air-fuel ratio searched for in the above manner are varied in accordance with the amount of $O_2$ stored within the ternary catalyst 15 during a lean operation. The larger the amount of $O_2$ is, the larger the enriching time is, and the higher the enriching target air-fuel ratio is.

On the other hand, if the target air-fuel ratio A/F is not lean last time at step S203, it is determined whether the engine is in a fuel-cut state last time at step S207 and if yes, a fuel-cut canceling command is outputted for the first time at step S208 and a stoichiometric switching command is outputted for the first time at step S209, i.e., the switching from fuel-cut to stoichiometric level is demanded at a command and the time of continuation of the fuel-cut operational state theretofore is searched for at step S210. Then, at step S211, an enriching target time and an enriching target air-fuel ratio are calculated based on the fuel-cut continuation time searched for at step S210.

Before the fuel-cut canceling command is outputted at step S208, the fuel cutting process continues at step S212.

In this manner, if the enriching target time and the enriching target air-fuel ratio are calculated during switching from lean level to stoichiometric level or during switching from fuel-cut to stoichiometric level, an enriching target time counter is set at step S213, and the enriching flag is set at "1" at step S214.

Then, at step S215, the target air-fuel ratio A/F is switched from the basic target air-fuel ratio searched for at step S201 to the enriching target air-fuel ratio determined at step S206 or step S211. More specifically, during switching from lean level to stoichiometric level, the target air-fuel ratio A/F is switched from the basic air-fuel ratio to the enriching target air-fuel ratio determined at step S206, and during switching from fuel-cut to stoichiometric level, the target air-fuel ratio A/F is switched over from the basic air-fuel ratio to the enriched target air-fuel ratio determined at step S211. Subsequently, the enriching target time counter is counted down at step S216. If the enriching target time has lapsed at step S217, an enriching flag is reset at "0" at step S218.

At step S219, an amount Ti of fuel injected from the fuel injection valve 6 is determined in accordance with the final target air-fuel ratio A/F, and an ignition time point and a fuel injection time point corresponding to the amount Ti of fuel injected are determined.

Figure 18:
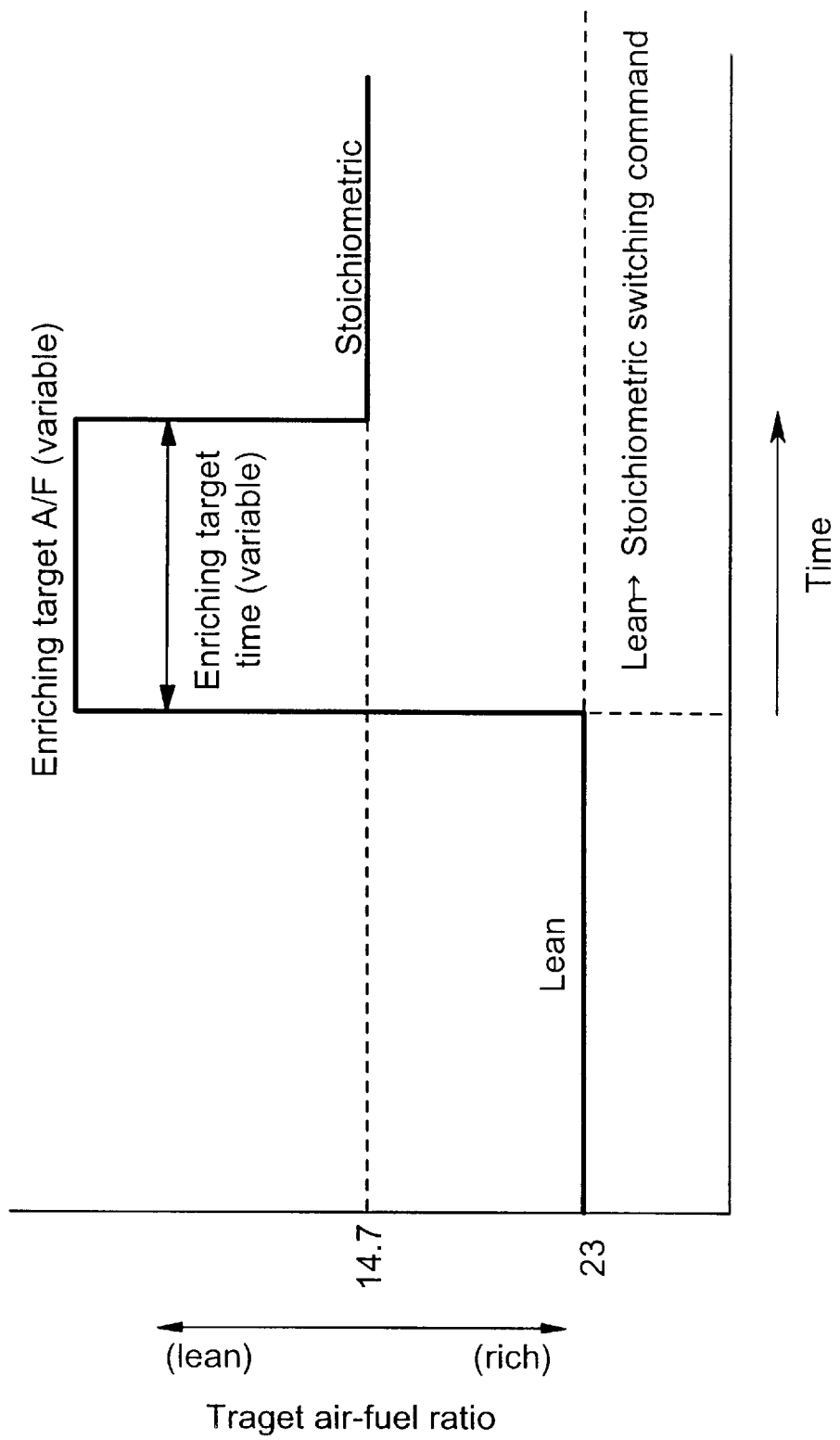

The above-described operation will be further described with reference to a time chart in FIG. 18. The time chart in FIG. 18 shows a case where the target air-fuel ratio A/F is switched from the lean level to the stoichiometric level. The target air-fuel ratio A/F during the lean operation is set at 23 which is the basic target air-fuel ratio. If the lean stoichiometric switching command is outputted, the target air-fuel ratio A/F is set at an enriched target air-fuel ratio further richer than the target air-fuel ratio A/F equal to 14.7 during the stoichiometric operation until the enriching target time lapses, in accordance with the enriching target time and the enriching target air-fuel ratio searched for based on the lean continuation time, the lean average load and the engine revolution number NE. After the enriching target time lapses, the engine shifts to the stoichiometric operation, and the target air-fuel ratio A/F is returned to 14.7 which is the basic target air-fuel ratio during the stoichiometric operation.

When the target air-fuel ratio A/F is switched over from the lean level (or the fuel cut) to the stoichiometric level in this manner, the amount of $NO_x$ discharged from the ternary catalyst 15 can be reduced by changing the target air-fuel ratio A/F to the stoichiometric level after maintaining it richer than the stoichiometric level for a predetermined time. Specifically, an excessive amount of $O_2$ is stored within the ternary catalyst during the lean operation and for this reason, the $NO_x$ converting function is not exhibited for a little while after switching from the lean operation to the stoichiometric operation. However, oxygen ($O_2$) stored within the ternary catalyst 15 can be immediately discharged by temporarily enriching the target air-fuel ratio A/F to more than the stoichiometric level during switching from lean level to stoichiometric level, thereby restoring the $NO_x$ converting ability of the ternary catalyst 15 to prevent the discharge of $NO_x$ to the atmosphere.

In addition, the conventional ternary catalyst 15 can be used as it is, as the exhaust emission control catalyst, without using an $NO_x$ occluding-type exhaust emission control catalyst which is still unsatisfactory in thermal deterioration resistance and an oxidation poisoning resistance. This is advantageous in durability and cost aspects.

Figure 19:
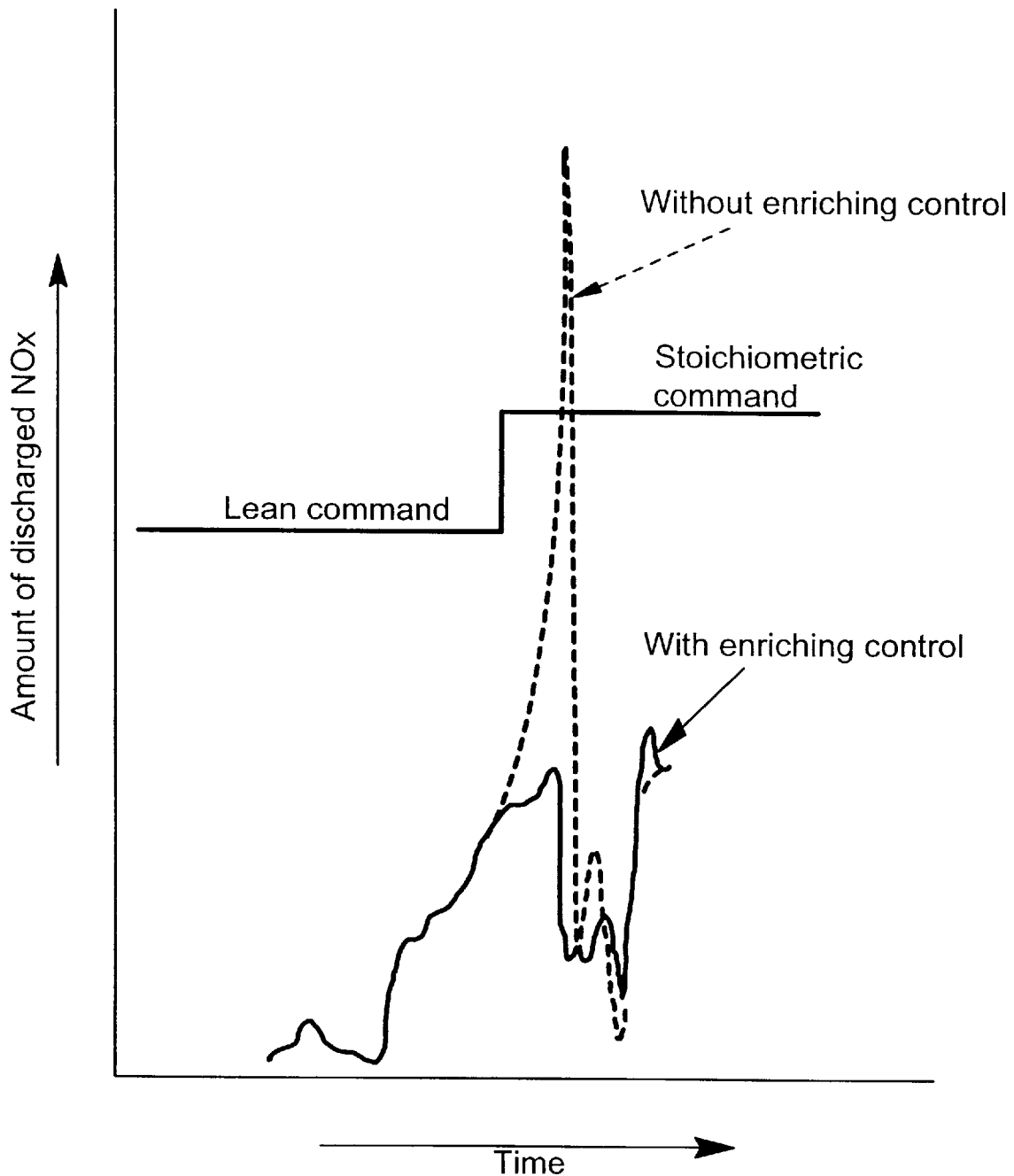

FIG. 19 shows the amount of $NO_x$ discharged when the enriching control is carried out (shown by a solid line) and the amount of $NO_x$ discharged when the enriching control is not carried out (shown by a dashed line). It can be seen from FIG. 19 that the amount of discharged $NO_x$ remarkably decreases by carrying out the enriching control.

Although the embodiment of the present invention has been described in detail, it will be understood that the present invention is not limited to the above-described embodiments and various modifications in design may be made without departing from the spirit and scope of the invention defined in claims.

For example, the target air-fuel ratios A/F for the four cylinders are simultaneously switched in the embodiment, but they may be sequentially switched at predetermined time intervals after outputting of the air-fuel ratio switching command. With such an arrangement, it is possible to alleviate the torque shock during switching of the air-fuel ratio. The lean state of the target air-fuel ratio in the present invention includes the fuel-cut state.

What is claimed is:

1. A control system in an internal combustion engine, comprising a means for detecting an operational state of the internal combustion engine, a valve timing changing means for changing a valve timing of at least one of an intake valve and an exhaust valve between low speed valve timing and high speed valve timing in accordance with said detected operational state of the internal combustion engine, a fuel supply means in an intake air supply passage of the engine for supplying an air-fuel mixture to the engine an air-fuel ratio control means for controlling switching of an air-fuel ratio of said air-fuel mixture supplied to the engine selectively to a richer level and to a leaner level than a theoretical air-fuel ratio, and an electronic control unit for determining when said valve timing changing means has changed the valve timing from said low speed valve timing with the air-fuel mixture at said leaner level to high speed valve time and for causing said air-fuel ratio control means to switch the air-fuel ratio of said air-fuel mixture to said richer level for a predetermined period after the valve timing is changed by said valve timing changing means to said high speed valve timing, said electronic control unit causing said air-fuel ratio control means to change the air-fuel ratio of said air-fuel mixture to said leaner level than the theoretical air-fuel ratio after said predetermined period.

2. A control system in an internal combustion engine according to claim 1, further including an ignition time point changing means controlled by said electronic control unit for changing an ignition time point of said engine in accordance with the valve timing changed by said valve-timing changing means, said ignition time point changing means controlling the ignition time point of the engine to an ignition time point corresponding to the valve timing provided after the valve timing changing via an intermediate ignition time point value which is between an ignition time point corresponding to a valve timing before the changing and the ignition time point corresponding to the valve timing after valve timing changing, when the valve timing is changed by said valve timing changing means.

3. A control system in an internal combustion engine, comprising a valve timing changing means for changing a valve timing of at least one of intake and exhaust valves in accordance with an operational state of the internal combustion engine, an ignition time point changing means for changing an ignition time point of the engine in accordance with the valve timing changed by said valve timing changing means, and an electronic control unit for determining when said valve timing means has changed said valve timing and for causing said ignition time point changing means to control the ignition time point of the engine to be an ignition time point corresponding to a valve timing provided after the valve timing changing via an intermediate value which is between an ignition time point corresponding to a valve timing before the changing and the ignition time point corresponding to the valve timing after the valve timing changing, when the valve timing is changed by said valve timing changing means.

4. A control process in an internal combustion engine in which a target air-fuel ratio is changed selectively to a stoichiometric level and a lean level and in which the engine is equipped with a ternary catalyst for purifying an exhaust gas, comprising the steps of determining when the target air-fuel ratio is changed from the lean level to the stoichiometric level, and then changing the air-fuel ratio to the stoichiometric level via a level richer than the stoichiometric level.

5. A control process in an internal combustion engine according to claim 4, including the step of determining when a target air-fuel ratio in a state further richer than said stoichiometric level and a time of continuation of said state have occurred based on a time of continuation of a latest lean level operation as well as a load and a number of revolutions of the internal combustion engine during said latest lean level operation.

6. A control process in an internal combustion engine according to claim 4, further including the step of changing an ignition time point of said engine in accordance with a valve timing change, said ignition time point change of the engine being to an ignition time point corresponding to a valve timing provided after the valve timing changing via an intermediate ignition time point value which is between an ignition time point corresponding to a valve timing before the valve timing changing and the ignition time point corresponding to the valve timing after the valve timing changing when the valve timing is changed.

7. A control process for an internal combustion engine having a valve timing changing means for changing a valve timing of at least one of an intake valve and exhaust valve in accordance with an operational state of the internal combustion engine, an ignition time point changing means for changing an ignition time point of said engine in accordance with the valve timing changed by said valve-timing changing means, and an air-fuel ratio control means for controlling switching of an air-fuel ratio of an air-fuel mixture supplied to the engine selectively to a richer level or a leaner level than a theoretical air-fuel ratio, comprising the steps of changing the valve timing and, at the time of said valve timing changing step, a step of at least one of (1) enriching the air-fuel ratio of said air-fuel mixture for a predetermined period by controlling said air-fuel ratio control means to cause the air-fuel ratio of said air-fuel mixture to be at the leaner level than the theoretical air-fuel ratio, and (2) controlling the ignition time point of the engine by said ignition time point changing means to an ignition time point corresponding to the valve timing provided after the valve timing changing through an intermediate ignition time point value which is between an ignition time point corresponding to a valve timing before the valve timing changing and the ignition time point corresponding to the valve timing after the valve timing changing.

8. A control process for an internal combustion engine according to claim 7, further including a step of a target air-fuel ratio being changed selectively to a stoichiometric level and a lean level wherein the engine is equipped with a ternary catalyst for purifying an exhaust gas and including a step when the target air-fuel ratio is changed from the lean level to the stoichiometric level of changing the target air-fuel ratio to the stoichiometric level through an intermediate level richer than the stoichiometric level.

9. A control process for an internal combustion engine according to claim 8, further including a step of a target air-fuel ratio in a state further richer than said stoichiometric level and a time of continuation of said state being determined based on a time of continuation of a latest lean operation as well as a load and a number of revolutions of the internal combustion engine during said latest lean operation.

* * * * *